(12) United States Patent
Hoa et al.

(10) Patent No.: US 8,227,527 B2
(45) Date of Patent: Jul. 24, 2012

(54) METHOD AND SYSTEM FOR MAKING HIGH PERFORMANCE EPOXIES, AND HIGH PERFORMANCE EPOXIES OBTAINED THEREWITH

(75) Inventors: Van Suong Hoa, Brossard (CA); Weiping Liu, Winnipeg (CA); Martin Pugh, Pointe-Claire (CA); Minh-Tan Ton-That, Montreal (CA)

(73) Assignees: Valorbec S.E.C., Montreal, Quebec (CA); Conseil National de Recherches Canada, Ottawa, Ontario (CA)

( * ) Notice: Subject to any disclaimer, the term of this patent is extended or adjusted under 35 U.S.C. 154(b) by 1246 days.

(21) Appl. No.: 10/596,750

(22) PCT Filed: Dec. 22, 2004

(86) PCT No.: PCT/CA2004/002184
§ 371 (c)(1),
(2), (4) Date: May 15, 2007

(87) PCT Pub. No.: WO2005/061620
PCT Pub. Date: Jul. 7, 2005

(65) Prior Publication Data
US 2007/0299202 A1   Dec. 27, 2007

Related U.S. Application Data

(60) Provisional application No. 60/531,618, filed on Dec. 23, 2003.

(51) Int. Cl.
*C08L 63/00* (2006.01)
*C08K 3/34* (2006.01)
*B01F 3/12* (2006.01)
*B01F 5/00* (2006.01)

(52) U.S. Cl. ........ 523/443; 523/440; 523/466; 366/336; 366/341

(58) Field of Classification Search .................. 523/440, 523/443, 466; 366/341, 336
See application file for complete search history.

(56) References Cited

U.S. PATENT DOCUMENTS
4,465,542 A * 8/1984 Furihata ................... 156/330
(Continued)

FOREIGN PATENT DOCUMENTS
EP     0 228 234 A2     7/1987
(Continued)

OTHER PUBLICATIONS

"Organoclay-Aerospace Epoxy Nanocomposites" by Chen et al.; International SAMPE Symposium and Exhibition, vol. 1, May 6, 2001, pp. 362-374; (XP008051803).*

(Continued)

*Primary Examiner* — Michael J Feely
(74) *Attorney, Agent, or Firm* — Novak Druce + Quigg LLP

(57) ABSTRACT

A method comprising preparing a solution of clay particles solution, submitting the solution of clay particles first to a high pressure and high velocity flow for shearing the particles in the solution of clay particles, and to a sudden lower pressure, whereby the particles explode into the mist of the solution of clay particles, and mixing the finely dispersed clay solution, whereby epoxy is introduced in the solution of clay particles during on of the above steps of preparing the solution of clay particles or dispersing the solution of clay particles or to the resulting dispersed solution of clay particles, yielding an extremely fine and homogeneous distribution of the particles of nanodimensions in the epoxy, yielding a high-performance nanocomposite epoxy.

23 Claims, 31 Drawing Sheets

U.S. PATENT DOCUMENTS

| | | | |
|---|---|---|---|
| 4,465,797 A | 8/1984 | Brownscombe et al. | |
| 4,664,842 A | 5/1987 | Knudson, Jr. et al. | |
| 4,687,796 A | 8/1987 | Cordova et al. | |
| 4,983,672 A | 1/1991 | Almer et al. | |
| 5,439,746 A | 8/1995 | Suzuki | |
| 5,505,895 A | 4/1996 | Bull et al. | |
| 5,514,734 A | 5/1996 | Maxfield et al. | |
| 5,747,557 A | 5/1998 | Hanyu et al. | |
| 5,747,560 A | 5/1998 | Christiani et al. | |
| 5,840,796 A | 11/1998 | Badesha et al. | |
| 6,040,350 A | 3/2000 | Fukui | |
| 6,107,387 A | 8/2000 | Kaylo et al. | |
| 6,174,967 B1 | 1/2001 | Soucek et al. | |
| 6,271,298 B1 * | 8/2001 | Powell | 524/445 |
| 6,287,992 B1 | 9/2001 | Polansky et al. | |
| 6,384,121 B1 | 5/2002 | Barbee et al. | |
| 6,391,449 B1 | 5/2002 | Lan et al. | |
| 6,407,155 B1 | 6/2002 | Qian et al. | |
| 6,500,892 B1 | 12/2002 | Bishop et al. | |
| 6,579,588 B2 | 6/2003 | Waid | |
| 2002/0055581 A1 | 5/2002 | Lorah et al. | |
| 2002/0058739 A1 | 5/2002 | Lorah et al. | |
| 2002/0086908 A1 | 7/2002 | Chou et al. | |
| 2002/0098309 A1 | 7/2002 | Bagrodia et al. | |
| 2002/0107318 A1 | 8/2002 | Yamada et al. | |
| 2002/0119266 A1 | 8/2002 | Bagrodia et al. | |
| 2002/0137834 A1 | 9/2002 | Barbee et al. | |
| 2002/0143094 A1 | 10/2002 | Conroy et al. | |
| 2002/0165305 A1 | 11/2002 | Knudson, Jr. et al. | |
| 2003/0026888 A1 * | 2/2003 | Guraya | 426/622 |
| 2003/0039812 A1 | 2/2003 | Tsai et al. | |
| 2005/0119371 A1 * | 6/2005 | Drzal et al. | 523/400 |

FOREIGN PATENT DOCUMENTS

| | | |
|---|---|---|
| EP | 0325058 | 7/1989 |
| EP | 0441047 | 8/1991 |
| EP | 0755415 | 1/1997 |
| EP | 0785971 | 7/1997 |
| EP | 0890616 | 1/1999 |
| EP | 0899300 | 3/1999 |
| EP | 1038913 | 9/2000 |
| EP | 1141136 | 10/2001 |
| EP | 1312582 | 5/2003 |
| WO | WO 93/11190 | 6/1993 |
| WO | WO 95/06090 | 3/1995 |
| WO | WO 96/11238 | 4/1996 |
| WO | WO 98/10012 | 3/1998 |
| WO | WO 00/78540 | 12/2000 |
| WO | WO 02/24759 | 3/2002 |
| WO | WO 02/079301 | 10/2002 |
| WO | WO 02/096982 | 12/2002 |
| WO | WO 03/066737 | 8/2003 |

OTHER PUBLICATIONS

Weiping Liu et al., Organoclay Modified High Performance Epoxy for Advanced Composites, 48th International SAMPE Symposium, May 11-15, 2003, 142:154.

Peter C. Lebaron et al., Polymer-Layered Silicate Nanocomposites: An Overview, Applied Clay Science 15 (1999) 11-29.

K.T. Gam et al., Fracture Behavior of Core-Shell Rubber-Modified Clay-Epoxy Nanocomposites, Polymer Engineering and Science, Oct. 2003, vol. 43, No. 10, 1635:1645.

* cited by examiner

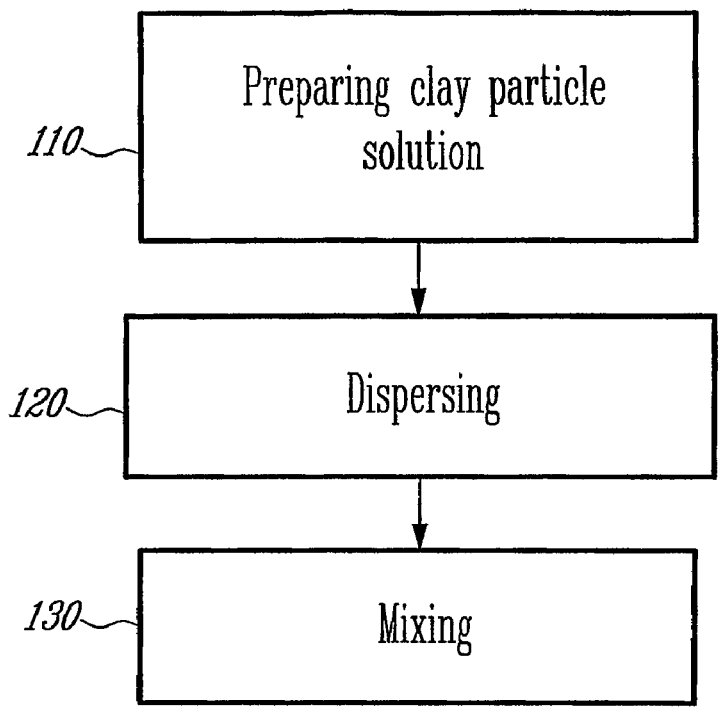
FIG_1
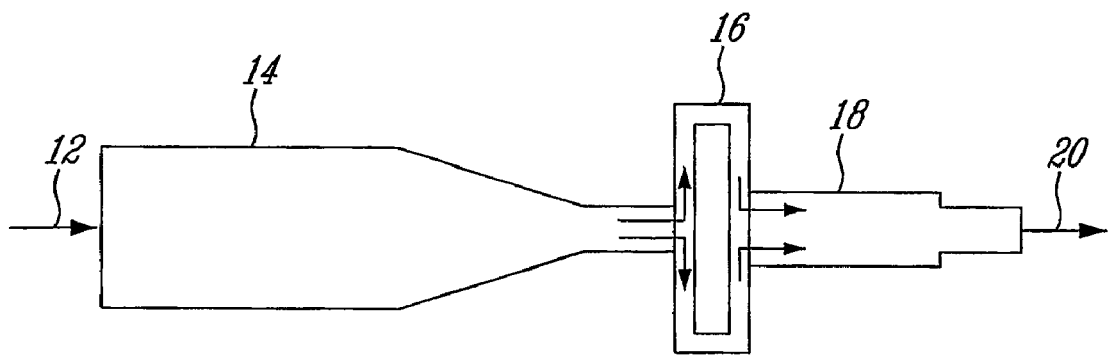
FIG_2

FIG_6

FIG_7

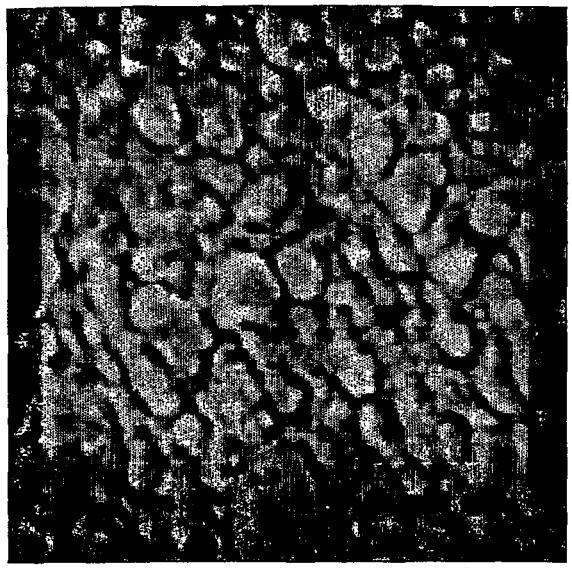
FIG_9a
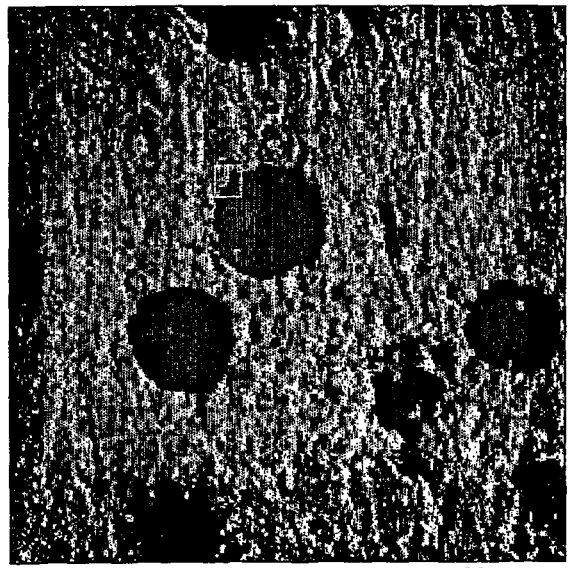
FIG_9b
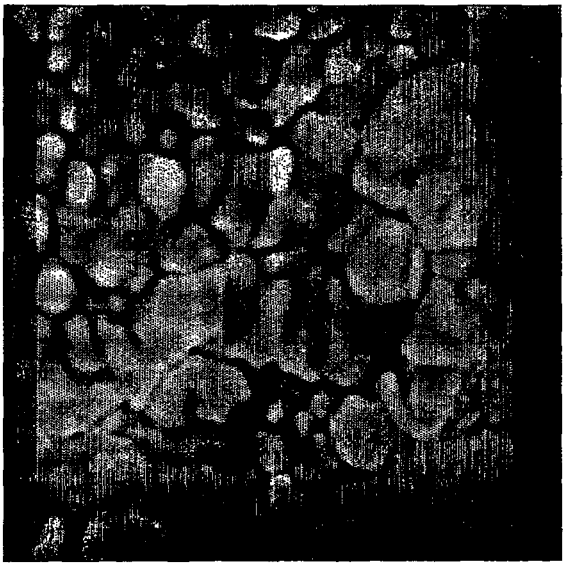
FIG_9c

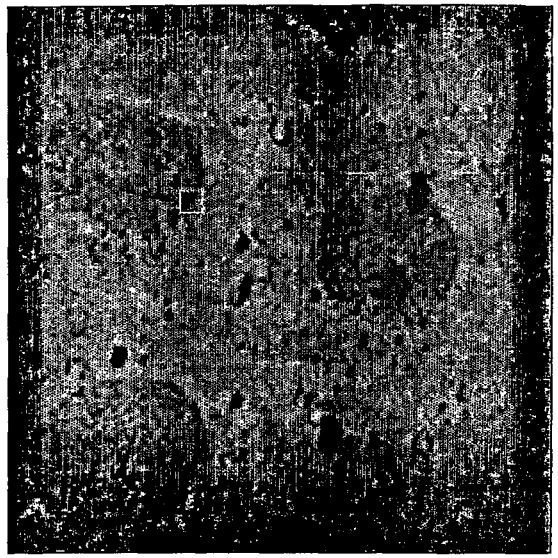
30 µm
FIG_9d
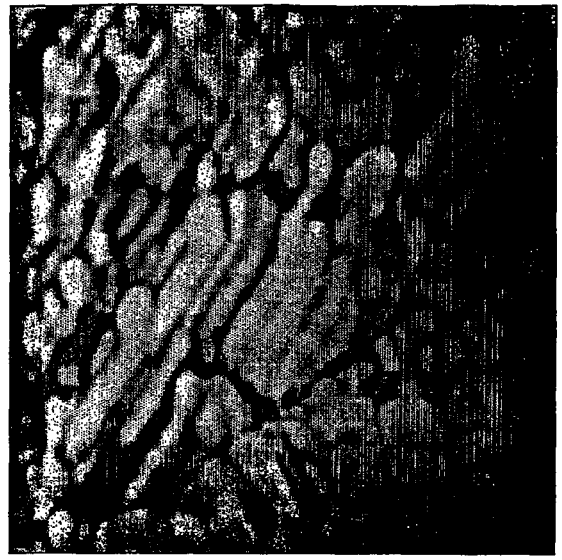
1 µm
FIG_9e
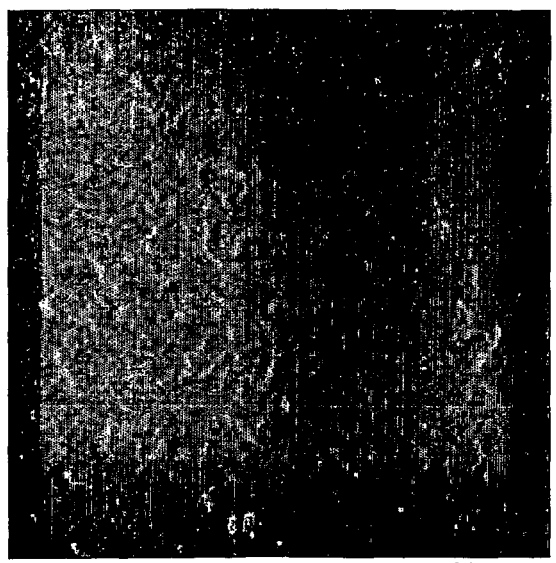
30 µm
FIG_9F

FIG_22

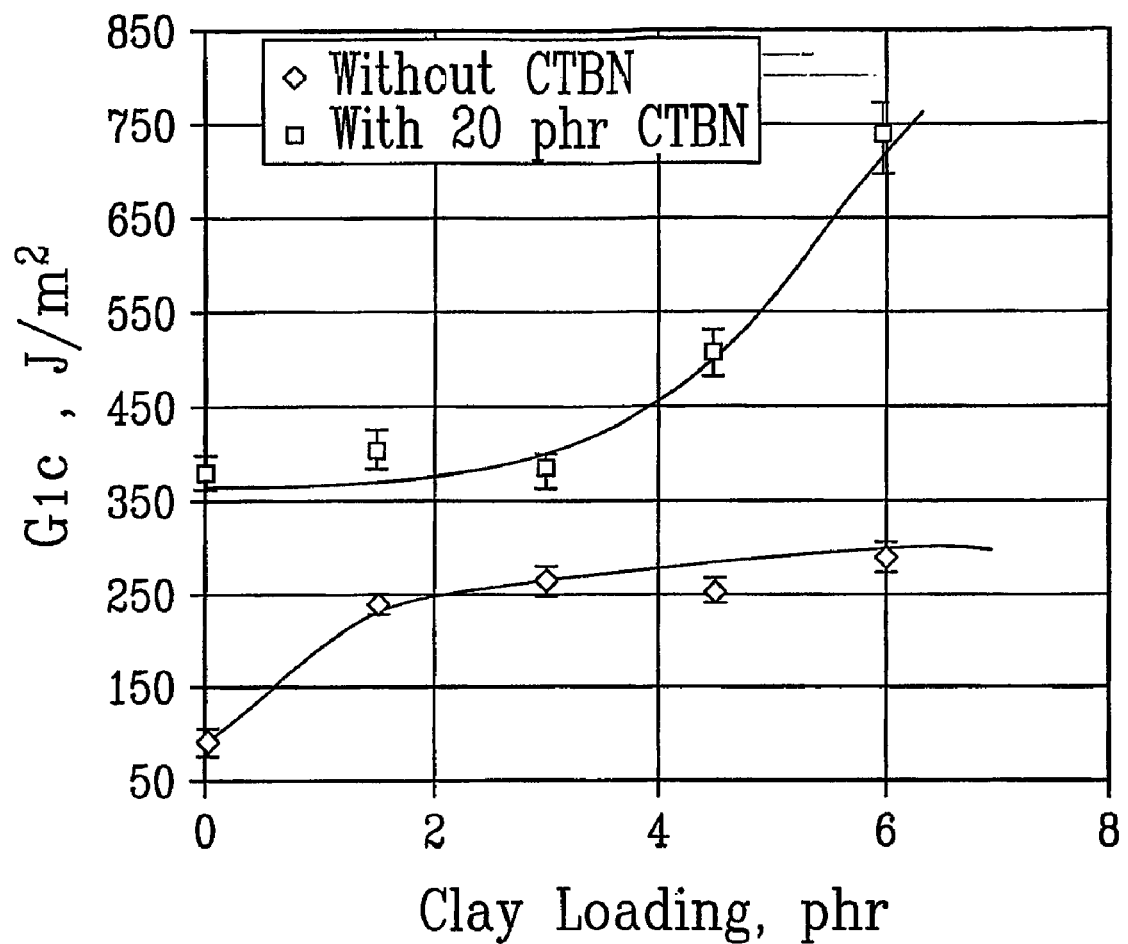
FIG_24

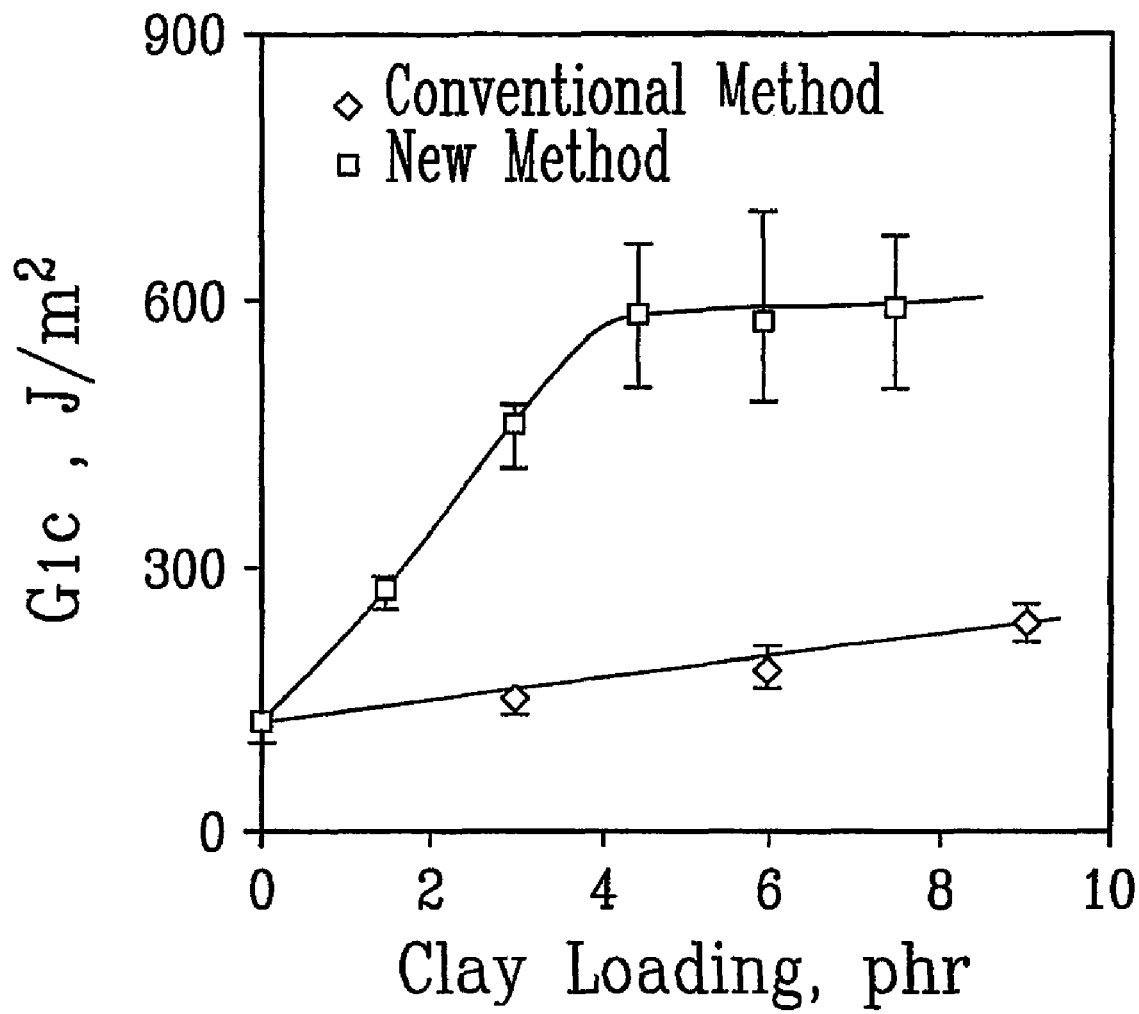
FIG_25

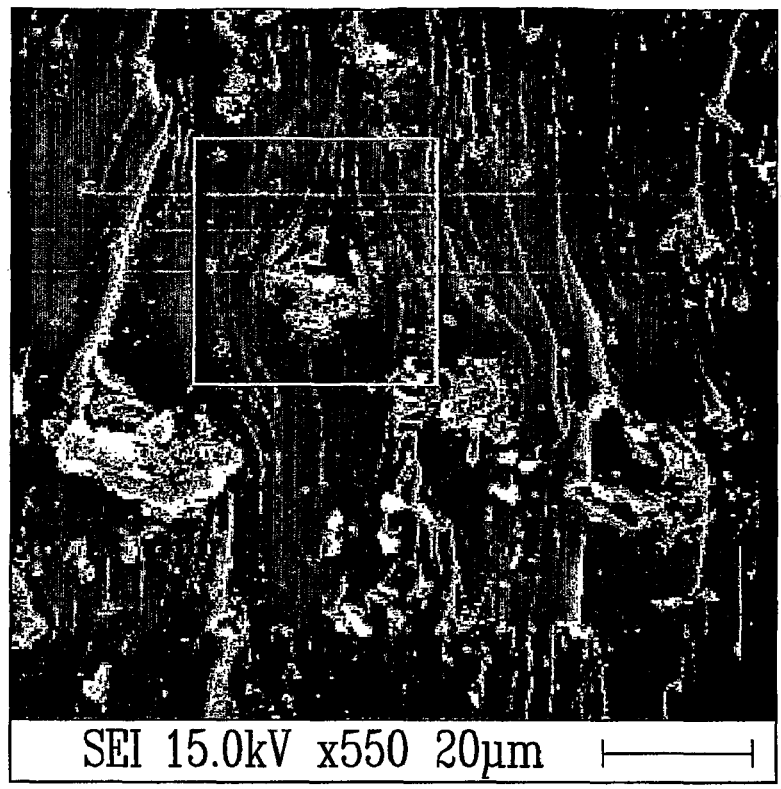
FIG_26a
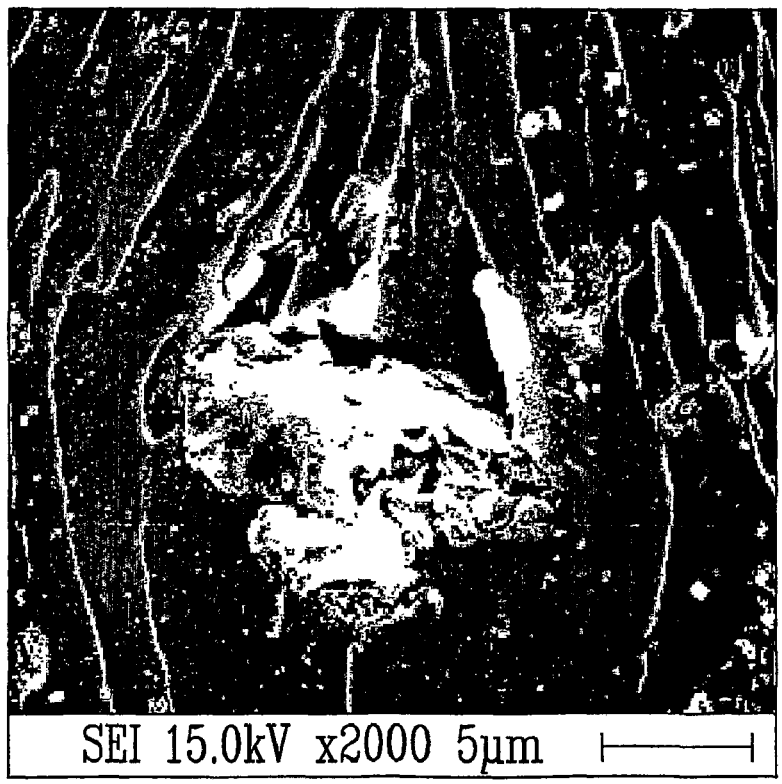
FIG_26b

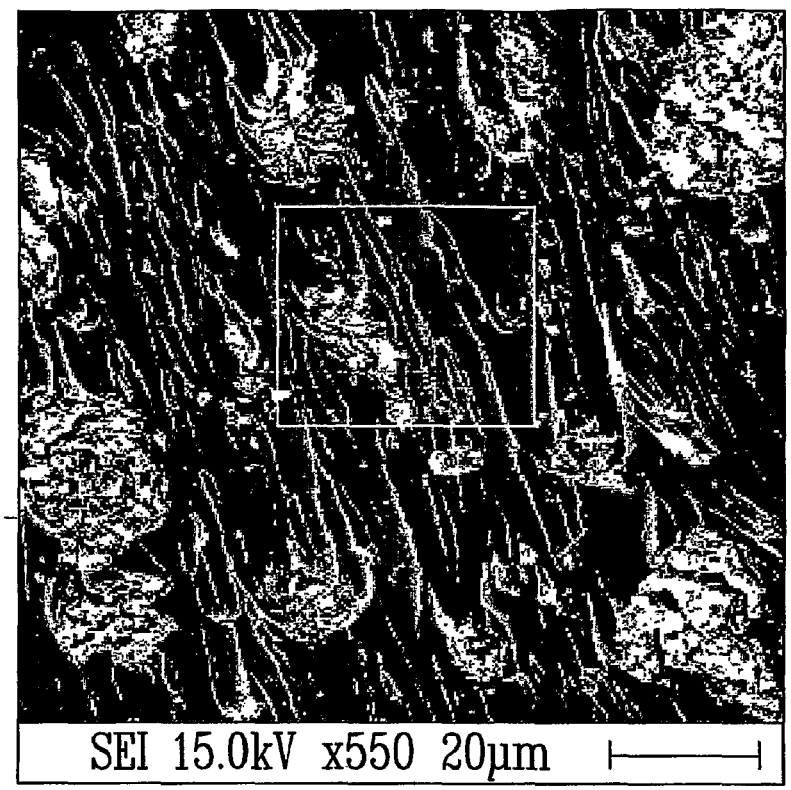
FIG_27a
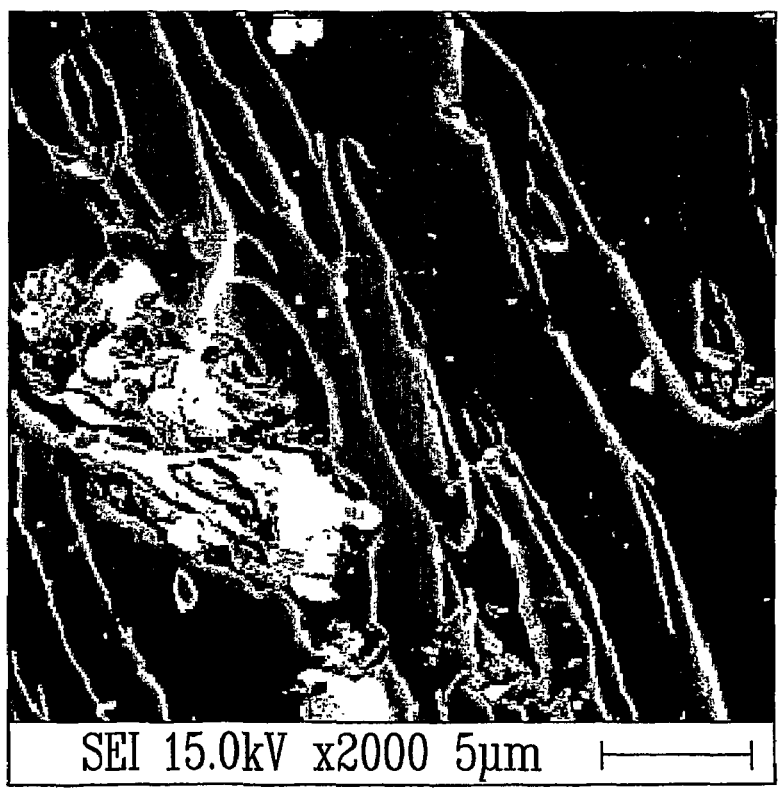
FIG_27b

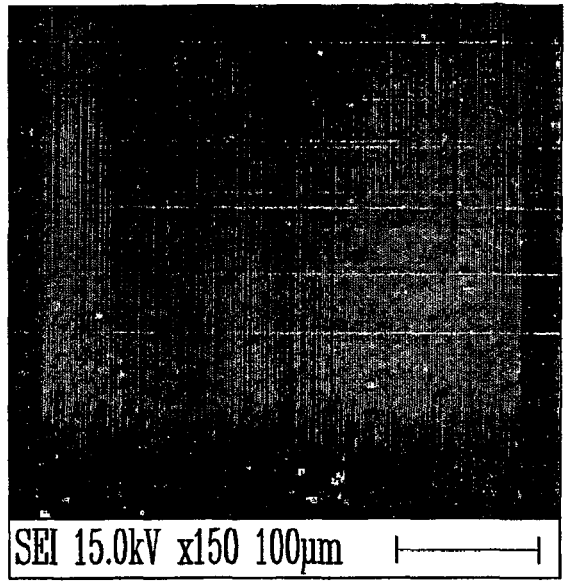 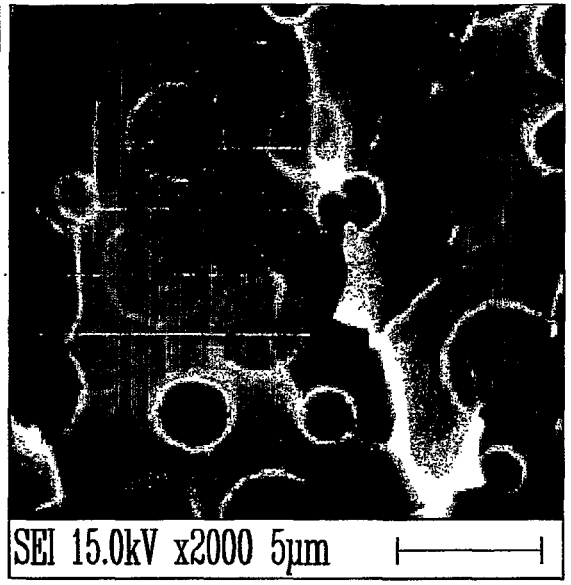
FIG. 29a    FIG. 29b
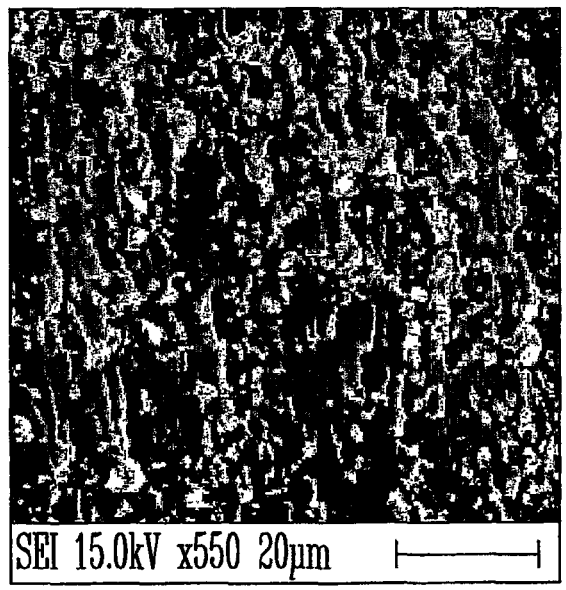 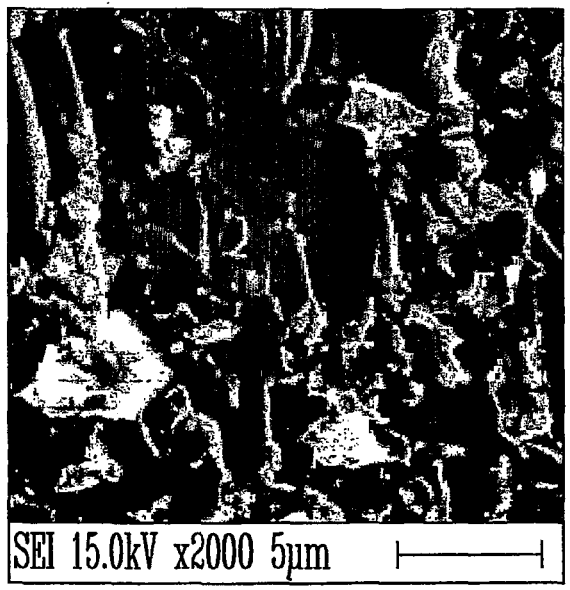
FIG. 29c    FIG. 29d

US 8,227,527 B2

METHOD AND SYSTEM FOR MAKING HIGH PERFORMANCE EPOXIES, AND HIGH PERFORMANCE EPOXIES OBTAINED THEREWITH

CROSS-REFERENCE TO RELATED APPLICATIONS

This application is a National Entry Application of PCT application no PCT/CA2004/002184 filed on Dec. 22, 2004 and published in English under PCT Article 21(2), which itself claims priority on U.S. provisional application No. 60/531,618, filed on Dec. 23, 2003. All documents above are herein in their entirety by reference.

FIELD OF THE INVENTION

The present invention relates to epoxies. More specifically, the present invention is concerned with a method and a system for making high performance epoxies, and with high performance epoxies obtained therewith.

BACKGROUND OF THE INVENTION

A number of fields have interest in epoxy materials, including for example the aero industry, space industry and automobile industry, or even in such fields as sport equipment manufacturing, adhesive and sealant manufacturing, wood products, coatings and manufacturing of components for pipes, boats and reservoirs, and transportation, train and space industries.

Since most epoxy resins for use in high temperature structural applications are brittle, a considerable amount of work has been undertaken in an attempt to enhance the toughness of these materials; moreover, over the years, efforts have been made to improve barrier resistance performance such as flammability resistance and water absorption resistance, of these materials. Typical toughening methods include the addition of a second phase such as rubber particles, thermoplastic particles or mineral fillers.

Polymer-layered silicate nanocomposites are another avenue, due to dramatic improvements in mechanical properties, barrier properties and thermal resistance at low clay loading observed in these materials as compared with a pristine matrix, i.e. with a polymer without clay.

It has been shown that organoclay may simultaneously improve both toughness and elastic modulus of epoxy resins in a more efficient way than fillers. Therefore, nanocomposite technology using organoclay as a nano-scale reinforcement offers an interesting alternative for modifying epoxy resins. Clay minerals are principally silicates of aluminium, iron, and magnesium and belong to the phyllosilicate (or layer silicate) family of minerals. Epoxies are usually thermosetting resins obtained by polymerisation of an epoxide, such as ethylene oxide or epichlorohydrin, especially with a diphenol.

The U.S. Pat. No. 4,465,797 by Brownscombe et al. describes a reinforced polymer composition comprising an epoxy resin matrix having intimately distributed therein a particulate or filamentary silicate or aluminosilicate mineral, in concentrations in the range from 10-30 phr (parts per hundred of resin by weight). A method for preparing such reinforced polymer composition comprises mixing the components into a liquid resin mixture, applying pressure thereto, forcing it through a ¾" diameter line into a mold, and removing the pressure.

In the U.S. Pat. No. 5,840,796, Badescha et al. disclose a polymer nanocomposites comprising a mica-type layered silicate and having an exfoliated structure or an intercalated structure resulting from mechanical shear.

In European patent EP 0890616, Suzuki et al. describe an epoxy composite comprising sheet-like clay reinforcement for improving the mechanical strength. In U.S. Pat. No. 6,391,449, Lan et al. describe a method for fabricating polymer-clay intercalates exfoliates nanocomposites comprising preparing a mixture of at least two swellable matrix polymers and incorporating the mixture with a matrix polymer by melt processing the matrix polymer with the mixture. Barbee et al., in U.S. Pat. No. 6,384,121, contemplate producing a nanocomposite comprising an epoxy resin and layered clay material, by forming a concentrate of the clay material and melt compounding the concentrate with the epoxy matrix. Polansky et al. in U.S. Pat. No. 6,287,992 propose a polymer nanocomposite comprising an epoxy resin matrix having dispersed therein particles derived from a multilayered inorganic material, and having an increased fracture toughness and enhanced barrier properties against small molecules.

Knudson Jr. et al., in the published United States patent application US 2002/0165305, disclose a method for preparing polymer nanocomposites by mixing dispersions of polymers and dispersions of clay minerals. More precisely, the method comprises mixing a dispersion of thermoplastic polymers in a first liquid carrier with a dispersion of clay in a second liquid carrier, wherein the dispersion of thermoplastic polymers may be achieved by a shearing process, the dispersion of clay may be achieved in a high shear mixer of a Manton-Gaulin mill type (described in Knudson Jr. et al's U.S. Pat. No. 4,664,842), and the mixing of the two dispersions is achieved under sufficient shear, with addition of flocculating agent, or filtration, centrifugation and drying.

Lorah et al., in the published United States patent application US 2002/0055581, recently contemplated a method for producing improved epoxy nanocomposite characterised by a uniform dispersion of clay therein by enhancing the affinity between the clay and the polymer at the interface.

Layered silicate clay is seen as an ideal reinforcement for polymers due to its high aspect ratio, but untreated clay is not easily dispersed in most polymers because of its natural hydrophilicity and incompatibility with organic polymers.

The high-performance tetraglycidyl-4,4'-diaminodiphenylmethane (TGDDM) epoxy resin and 4,4'-diaminodiphenyl sulphone (DDS) system is widely used as the matrix for advanced composites in military and civil aircraft due to its good comprehensive properties such as excellent adhesion with fiber, relatively high strength and stiffness at room and elevated temperatures, processing versatility and reasonable cost etc. However, this resin system is very brittle and flammable, and has a high equilibrium content of water absorption.

A hybrid approach of adding both fillers and rubbers to epoxy resins has also been studied. However, a high concentration of fillers results in the reduction of processability.

Therefore there appears to be still a need in the art for an improved method and system for making high-performance epoxies.

SUMMARY OF THE INVENTION

There is provided a method for making high performance epoxies, comprising the steps of: a) preparing a solution of clay particles; b) dispersing the solution of clay particles; and c) mixing a resulting dispersed clay particles solution; whereby a pristine epoxy is incorporated during one of steps a), b) and c), particles of nano-dimensions in a resulting epoxy being finely and homogeneously distributed, yielding a high-performance epoxy.

There is further provided a system for making a high performance epoxy from a pristine epoxy, comprising: a first container for preparing a solution of clay particles; a device for dispersing the solution of clay particles; and a second container for mixing a dispersed solution of clay particles; wherein the device for dispersing the solution of clay particles comprises a first section submitting the solution of clay particles to a high pressure gradient and a high velocity; a second section of obstacle; and a pressure-collapse chamber; an output solution from the device having a fine and homogeneous distribution of clay particles of nano-dimensions.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 1 is a flowchart of a method for making high performance epoxies according to an embodiment of a first aspect of the present invention;

FIG. 2 is a schematic illustration of a device according to an embodiment of a second aspect of the present invention, used for dispersing the clay solution in step 120 of method of FIG. 1;

FIG. 9 shows AFM micrographs of a) a DGEBA/BF$_3$.MEA epoxy system (1×1 µm); b) a two-phase structure of a rubber-modified epoxy (30×30 µm); c) a two-phase structure of a rubber-modified epoxy (1×1 µm); d) rubber-modified nanocomposites at 3-phr clay loading (30×30 µm); e) rubber-modified nanocomposites at 3-phr clay loading (1×1 µm); f) rubber-modified nanocomposites at 6-phr clay loading (30×30 µm);

FIG. 24 is a graph of the critical strain energy release rate ($G_{1c}$) of modified nanocomposites as a function of clay loading;

FIG. 25 is a graph of the critical strain energy release rate ($G_{1c}$) of epoxy TGDDM/DDS prepared with a Direct Mixing Method (rhomboids) and with the method of the present invention (squares).

FIG. 26 shows SEM micrographs of fracture surface of filler composites obtained with the direct mixing method (DMM) at 6-phr unmodified clay;

FIG. 27 shows SEM micrographs of fracture surface of nanocomposites obtained with the direct mixing method (DMM) at 6-phr organoclay;

DESCRIPTION OF EMBODIMENTS OF THE INVENTION

Figure 3B:
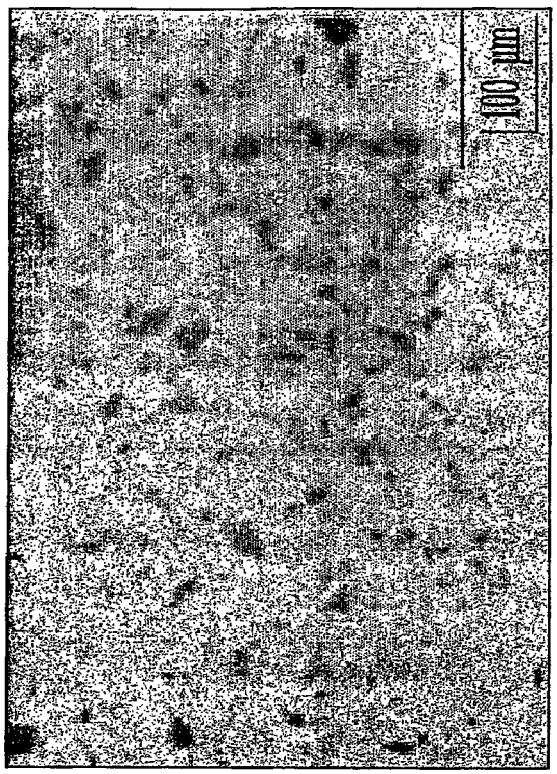
FIG. 3 shows optical micrographs of epoxy obtained by a direct mixing method (DMM) a) containing 6-phr unmodified clay and b) containing 6-phr organoclay.

Generally stated, the present invention provides a method and a system for making epoxies with improved mechanical and barrier resistance properties.

As illustrated in FIG. 1, a method according to the present invention comprises preparing a clay solution (step 110), dispersing the clay solution (step 120); and mixing the clay solution (step 130).

The step 110 comprises mixing solvents and clay particles of a dimension in the nanometer range in a liquid solution, as will be described with more details hereinbelow in relation to specific examples. Alternatively, epoxy may also be mixed in solution with the clay particles at this stage Mechanical or ultrasonic mixing may take place at this stage.

The step 120 comprises submitting the clay solution to high pressure gradient between input and output to generate a high flow velocity and velocity yielding a shearing flow in a micrometer-range circuit allowing breaking impacts of the particles against walls thereof, then to a lower pressure, whereby the particles explode into the mist of the solution due to the smaller pressure.

In step 130, the dispersed clay solution is mixed with an epoxy and curing agents, as well as with additives, such as diluents and hardeners, as is well known in the art, yielding a solid epoxy material. The epoxy may be a rubber-modified epoxy, as will be shown further herein. Alternatively, in the case epoxy was introduced in step 110, additives are introduced in this mixing step 130.

In both cases, after mixing (step 130), the resulting epoxy is ready for subsequent forming and heating treatment steps, as known in the art.

A device used for dispersing the clay solution (step 120 described above) may take a form illustrated in FIG. 2. Such a system comprises an input 12 for a clay solution, a first section 14 of increasing pressure, leading to a second section 16 where the velocity increases sharply and where obstacles favour breaking impacts of the particles against walls thereof, and to a chamber 18 of collapse of pressure. At an output 20, an extremely fine and homogeneous distribution of particles of nano-dimensions is obtained in the solution.

In the case of a tubular structure, the first section 14 is typically defined by a small diameter of a tubular structure used, so that the mixture is submitted to a high pressure of the order of 20,000 psi (pounds per square inch) for example, and to generate a high velocity, thereby allowing shearing in the liquid solution to occur in tubes of a diameter about 0.1 mm for example. The second section 16 may have a zigzag configuration for example, so as to increase a length of breaking impact occurrences.

Following the method described hereinabove in relation to FIG. 1, organoclay nanocomposites and filler composite epoxies are obtained, using as a pristine epoxy an epoxy resin such as TGDDM (N,N,N',N'-tetraglycidyl-4,4'-diaminQ-diphenylmethane), with a hardener such as DDS (4,4'-diaminodiphenyl sulphone); as an organoclay a commercially available organoclay suitable for dispersion into an epoxy resin such as Nanomer I.30E (Nanocor); and as an unmodified clay, a natural montmorillonite such as Cloisite Na$^+$ (Southern Clay Product).

The method is also applied to yield rubber-modified epoxy nanocomposites using as a pristine epoxy a DGEBA epoxy resin (a diglycidyl ether of bisphenol A), with a curing agent such as boron trifluoride monoethylamine ($BF_3$.MEA); as a rubber a reactive liquid rubber such as Hycar CTBN1300×8 (Noveon Inc.); and as an organoclay an octadeyl amine-modified montmorillonite suitable for dispersion into epoxy resin, for example.

The resulting epoxies are compared with corresponding epoxies obtained with a direct mixing method (DMM) known in the art. For that purpose, a number of tests is carried on a produced range of epoxy nanocomposites (epoxy plus organoclay), filler composites (epoxy plus unmodified clay), and on hybrid epoxy nanocomposites modified with rubber, synthesized by the direct mixing method (DMM) and by the method of the present invention, referred as a high pressure mixing method (HPMM).

The present method may then be compared with the direct mixing method (DMM), by comparing the properties of the obtained epoxies.

A first series of physical measurements aims at studying the morphology of the different epoxies.

Figure 3A:
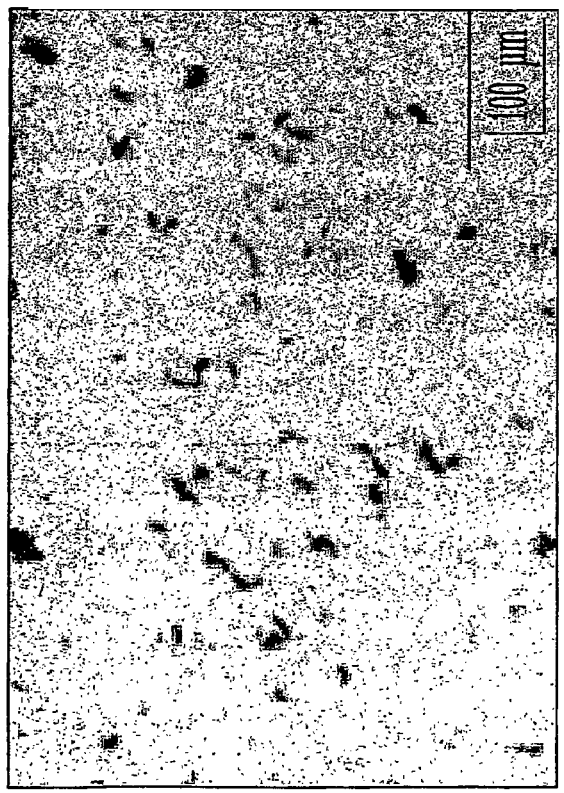

As may be seen from scanning electronic microscopy images of FIGS. 3a and 3b, the direct mixing method (DMM) yields cured systems of filler composites containing a large number of agglomerates of unmodified clay, most of them transparent and having a clear interface with the resin due to their crystal structure (FIG. 3a), and nanocomposites also exhibiting a large number of agglomerates with an observed maximum diameter of about 20 μm, the size and quantity of these agglomerates being larger than in the filler composites at a similar clay loading (FIG. 3b). The direct mixing method (DMM) does not result in obvious changes in size and quantity of agglomerates in nanocomposites when modifying parameters such as the stirring rate, temperature and time of mixing, or curing parameters.

In the mixture of organoclay and TGDDM epoxy obtained by the direct mixing method (DMM), examined right after it is prepared in order to study the formation of agglomerates, agglomerates are observed under an optical microscope when the mixture is diluted with acetone, which are similar to those observed in the cured samples above. Such results indicate that agglomerates in nanocomposites result from a poor dispersion.

On the other hand, in the paste of organoclay and acetone obtained by the method of the present invention, inspected with optical microscopy for comparison, the size and quantity of agglomerates observed is considerably lower. Most of the agglomerates are less than 1 μm and a maximum diameter observed is only between about 1 and 2 μm, which seems to indicate that the method of the present invention achieves an enhanced breaking down thereof.

Figure 4:
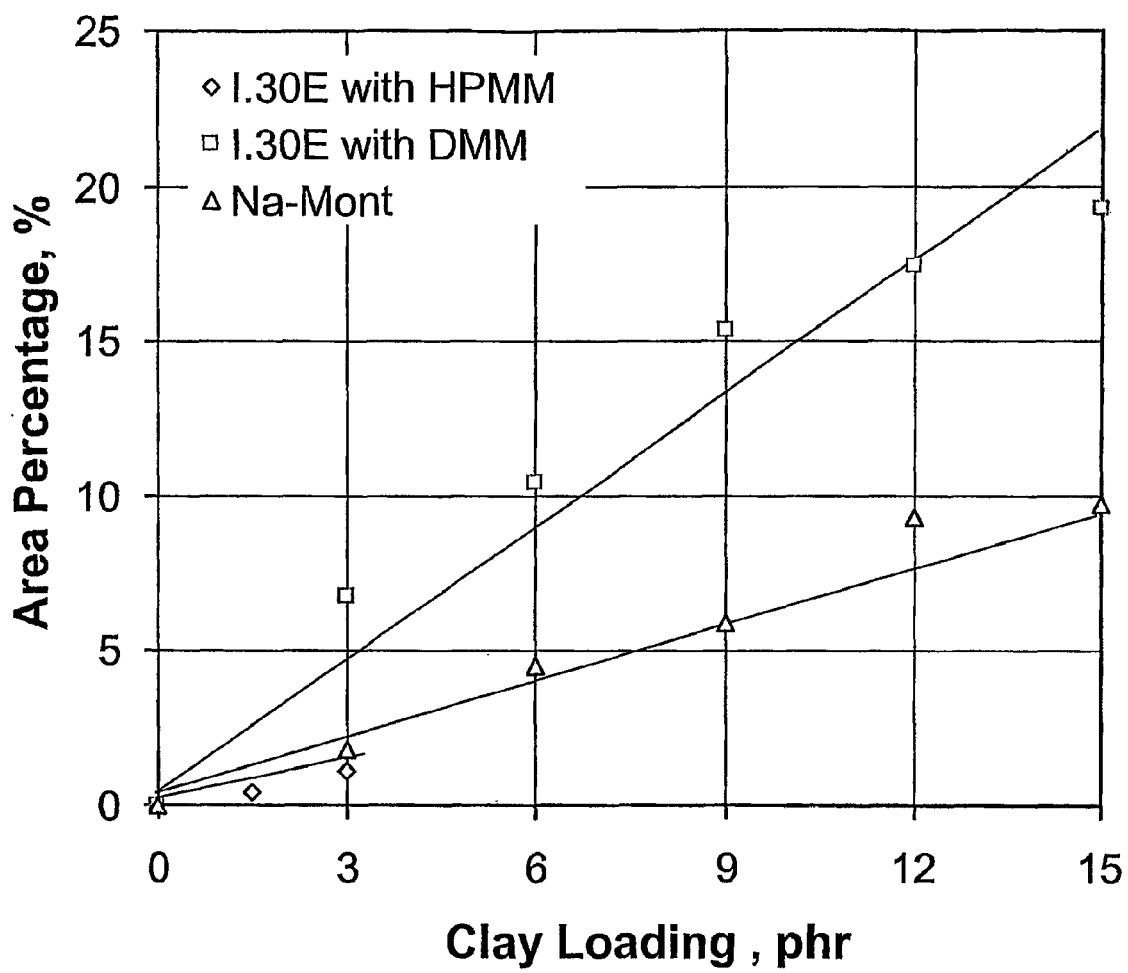
FIG. 4 is a graph of an area percentage of agglomerates in nanocomposites and filler composites as a function of clay loading.
Figure 5:
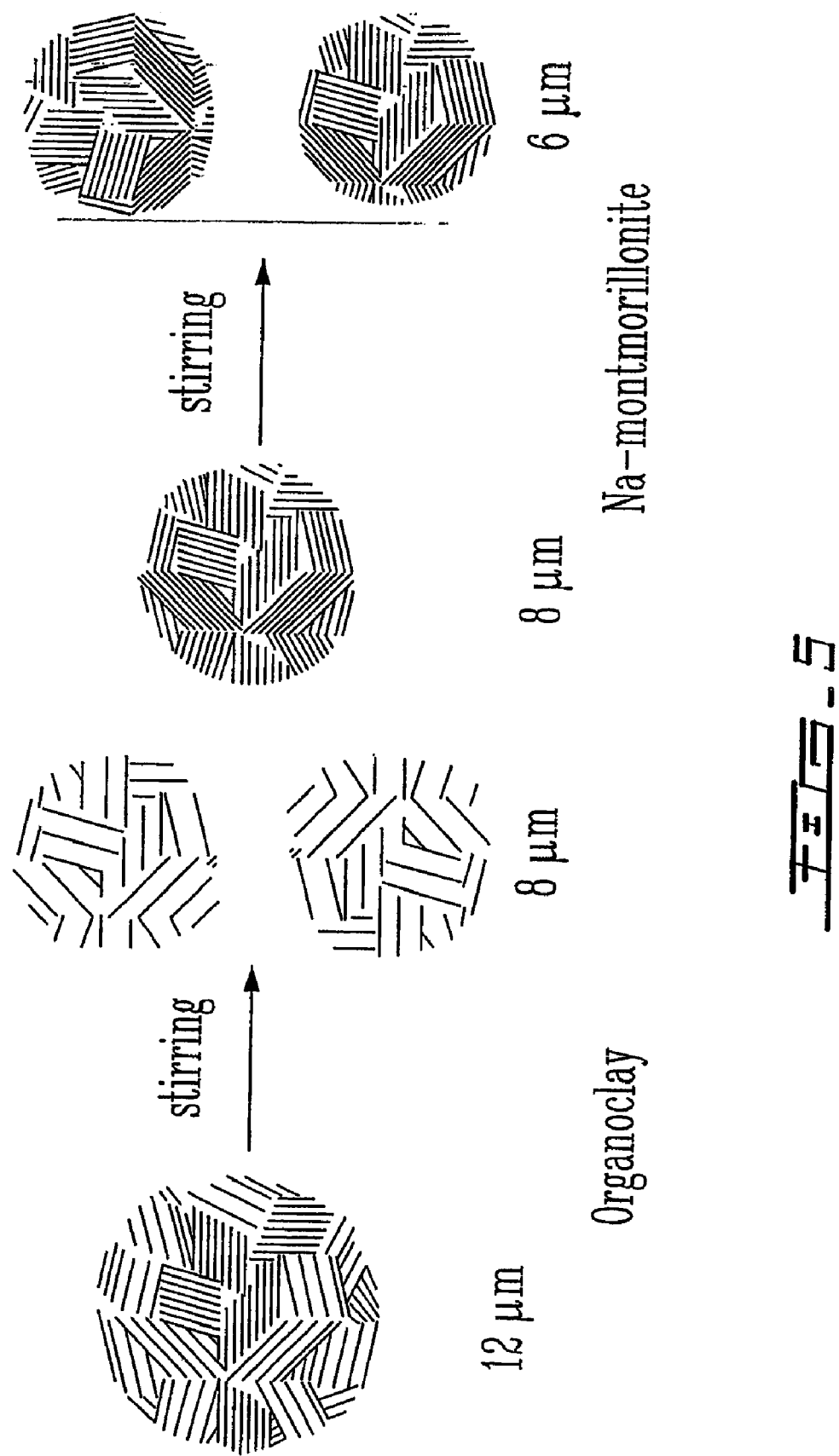
FIG. 5 illustrates schematically the dispersion of organoclay and unmodified clay.

Area percentages of agglomerates in nanocomposites and filler composites (composites made using natural clay) are shown in FIG. 4. FIG. 4 illustrates the results from nanocomposites obtained by the direct mixing method (DMM), nanocomposites obtained by the present method and filler composites (composites made using natural clay) obtained by the direct mixing method (DMM). Nanocomposites obtained by the direct mixing method (DMM) (squares) have area of agglomerates about twice as large as in filler composites (triangles) obtained with the same direct mixing method (DMM) at a similar clay loading. Such a result may suggest that the unmodified clay is submitted to one mechanism for reduction of the size of the agglomerates, i.e. breaking of the particle size, whereas the organoclay in the direct mixing method (DMM) is subjected to two competing processes (FIG. 5), including break up, which tends to decrease the size of the agglomerates, and intercalation by resin and hardener, which tends to increase the size thereof.

In contrast, the materials obtained by the method of the present invention (rhomboids) have a reduced agglomerate area, which indicates an increased dispersion, resulting of the breaking of the particles.

Figure 6:
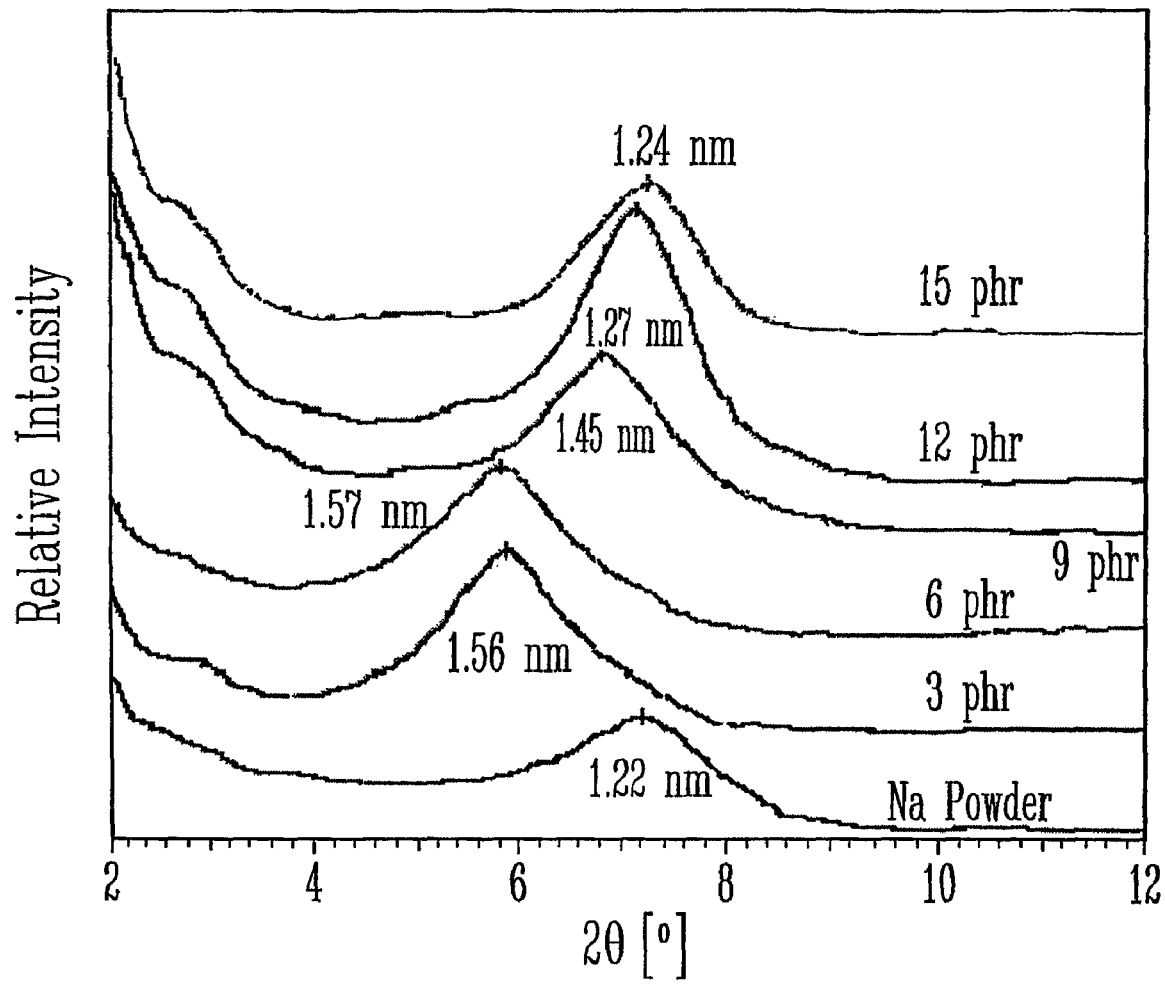
FIG. 6 shows XRD patterns of unmodified clay and of composites thereof obtained with the direct mixing method (DMM)

FIG. 6 shows XRD curves of unmodified clay and filler composites obtained by the direct mixing method (DMM) at different clay loadings.

For a pure clay (without epoxy), a prominent peak corresponding to the basal spacing of the clay occurs at 1.22 nm. In an epoxy at low clay loadings, this prominent peaks shift slightly and the basal spacing of composites with 3-phr clay and 6-phr clay increases from 1.22 nm to 1.56 nm and 1.57 nm respectively, which indicates that a small quantity of hardener or resin is forced into galleries of the clay. As the clay loading increases in the epoxy, the basal spacing of the clay in the filler composites falls back to the original value as that of pure clay.

Figure 7:
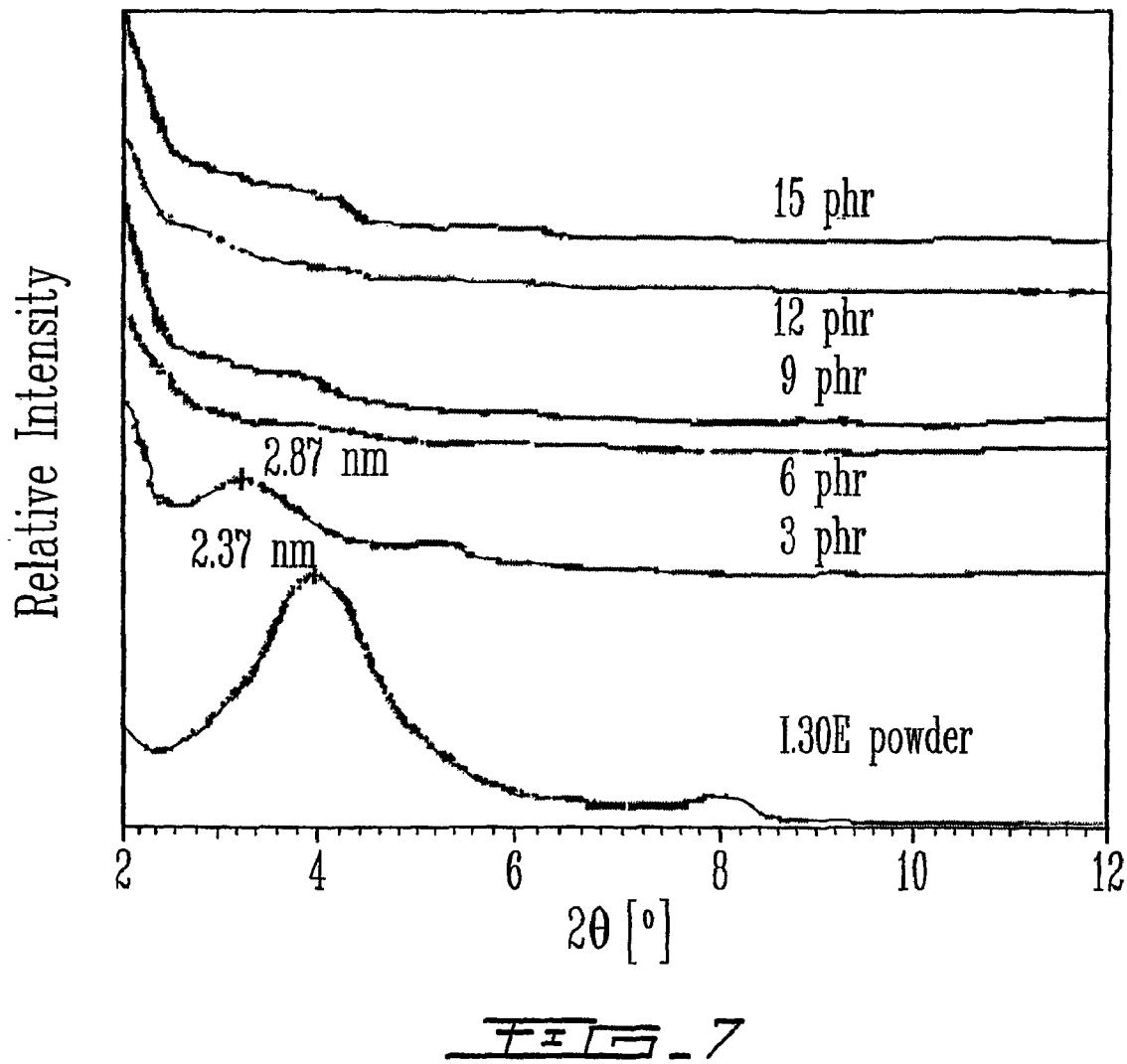
FIG. 7 shows XRD patterns of I.30E organoclay and of nanocomposites thereof obtained with the direct mixing method (DMM)

FIG. 7 shows XRD curves of organoclay and organoclay-nanocomposites obtained by the direct mixing method (DMM). A prominent peak corresponding to the basal spacing of the organoclay is observed at 2.37 nm, whereas in filler composites, the prominent peaks are mostly absent, which confirms the formation of exfoliated nanocomposites, while a few shoulders and small peaks in some of the curves indicate the presence of intercalated nanocomposites. This indicates that the organoclays in nanocomposites obtained with the direct mixing method (DMM) are exfoliated or intercalated, and that they are not uniformly distributed in the epoxy resin since most of them are aggregated on the micro scale.

Figure 8:
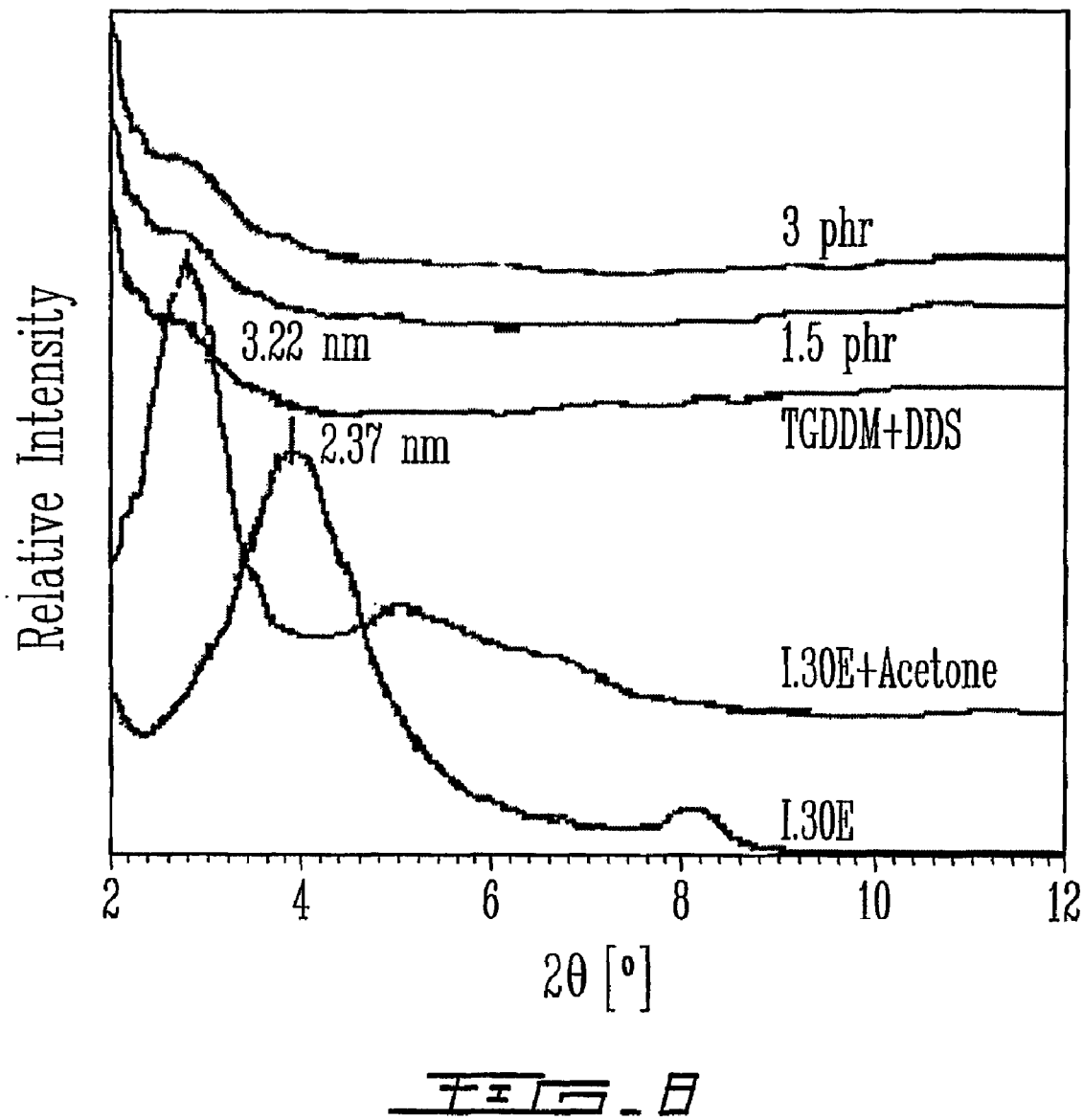
FIG. 8 shows XRD patterns of I.30E and of nanocomposites thereof with the method of the present invention.

XRD curves of organoclay nanocomposites obtained by the method of the present invention presented in FIG. 8 show that the basal spacing of the clay increases from 2.37 nm to 3.22 nm. There are no peaks in the XRD curves of hanocomposites containing 1.5-phr and 3-phr I.30E, and their curves are similar to those of the TGDDM-DDS system. This indicates that the present method enhances the degree of exfoliation of organoclay and breaks up the agglomerates of organoclay.

In the case of rubber modified epoxy nanocomposites, in a typical AFM (atomic force microscope) micrograph of a DGEBA/$BF_3$.MEA epoxy system (1×1 μm) (FIG. 9a), a two-phase microstructure, consisting of a bright matrix and relatively dark interstitial regions, is observed, with bright nodules of a size in the range between 100 nm and 200 nm. When observing the two-phase structure of rubber-modified epoxy (FIGS. 9b and 9c), the rubber spheres being dispersed in the continuous epoxy matrix, it appears that the size of nodules in the rubber phase is larger than that in the epoxy phase and that the interface between rubber and epoxy is indistinct.

Rubber particles of hybrid nanocomposites at 3-phr clay loading are also observed (FIGS. 9d and 9e), wherein the nodules of rubber phase appear to be oriented and the interface is clear. When the clay loading increases to 6-phr (FIG. 9f), a two-phase system of this hybrid nanocomposite is obtained from Dynamic Mechanical Analysis (DMA) results.

DMA is further used to measure the glass transition temperature (Tg) of different epoxies.

Figure 10:
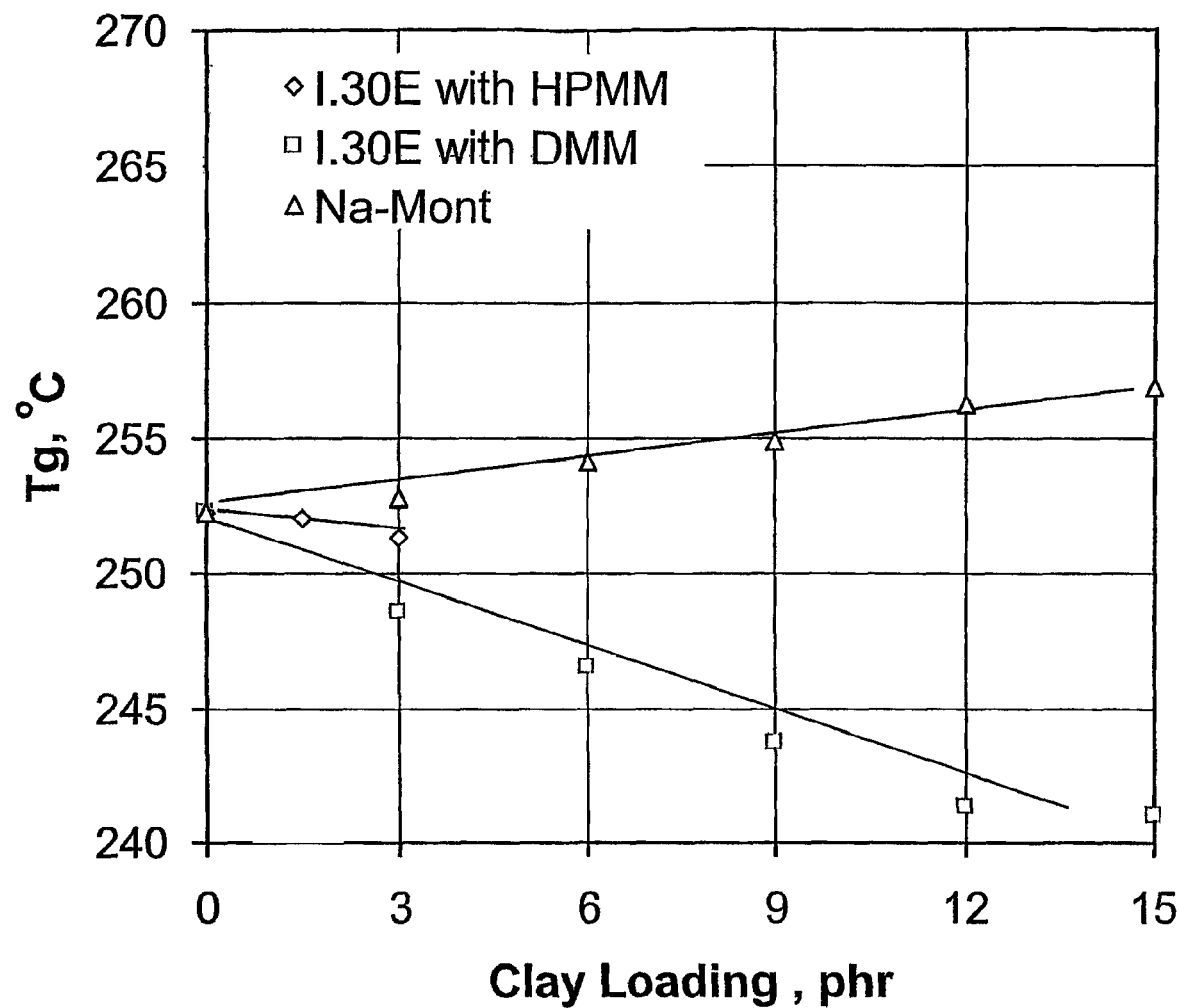
FIG. 10 illustrates the behaviour of the glass transition temperature (Tg) of nanocomposites and filler composites as a function of clay loading.

In the case of nanocomposites and filler composites, as may be observed in FIG. 10, the glass transition temperature of nanocomposites obtained with the direct mixing method (DMM) (squares) appears to decrease slightly when the clay loading increases, in contrast to that of filler composites (triangles). Such a decrease is found to be of the order of 10° C. for nanocomposites at 12-phr organoclay loading.

In contrast, the glass transition temperature Tg of nanocomposites obtained with the method of the present invention (rhomboids) appears to decrease very little and is higher than that obtained with the direct mixing method (DMM) (squares) at a similar clay loading. Such a reduction of the glass transition temperature may be explained by the fact that the organoclay catalyzes the homopolymerization of the TGDDM resin during the mixing step of the present method and hence modifies the network of the cured epoxy. Surface modifiers or small molecules from thermal degradation of the surface modifier at high temperature may exist in the system and act as lubricators.

Figure 11:
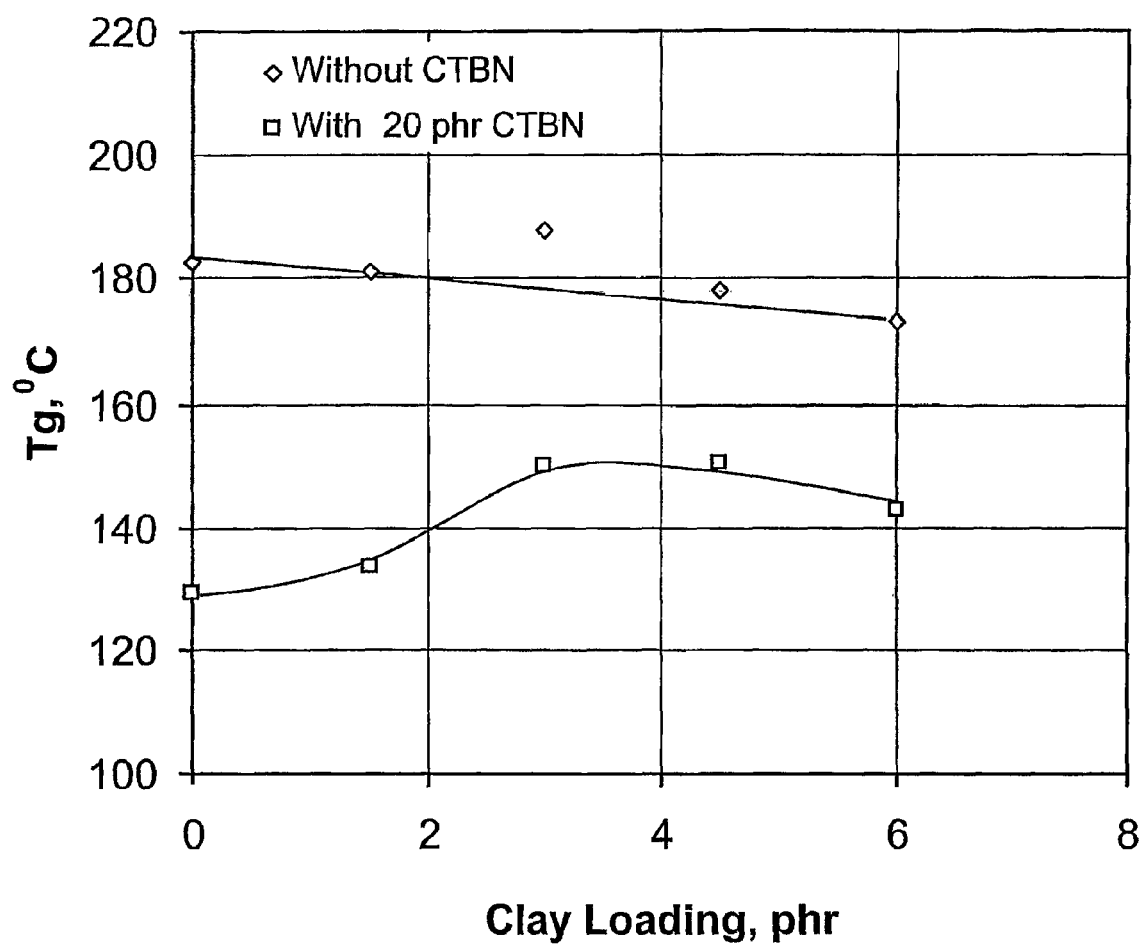
FIG. 11 illustrates the behaviour of the glass transition temperature (Tg) of nanocomposites and filler composites as a function of clay loading.

FIG. 11 shows the glass transition temperature (Tg) of nanocomposites with (squares) and without CTBN (rhomboids). Nanocomposites without CTBN (rhomboids) have a higher glass transition temperature Tg, which decreases slightly as a function of clay loading. The reduction in the glass transition temperature Tg is found to be of the order of 10° C. for nanocomposites at 6-phr organoclay loading. In contrast nanocomposites with CTBN (squares), due to the presence of CTBN, have a lower glass transition temperature (Tg), which increases with increasing the clay loading below 4.5-phr. A maximum enhancement is 21° C. at 4.5-phr clay loading.

Figure 12:
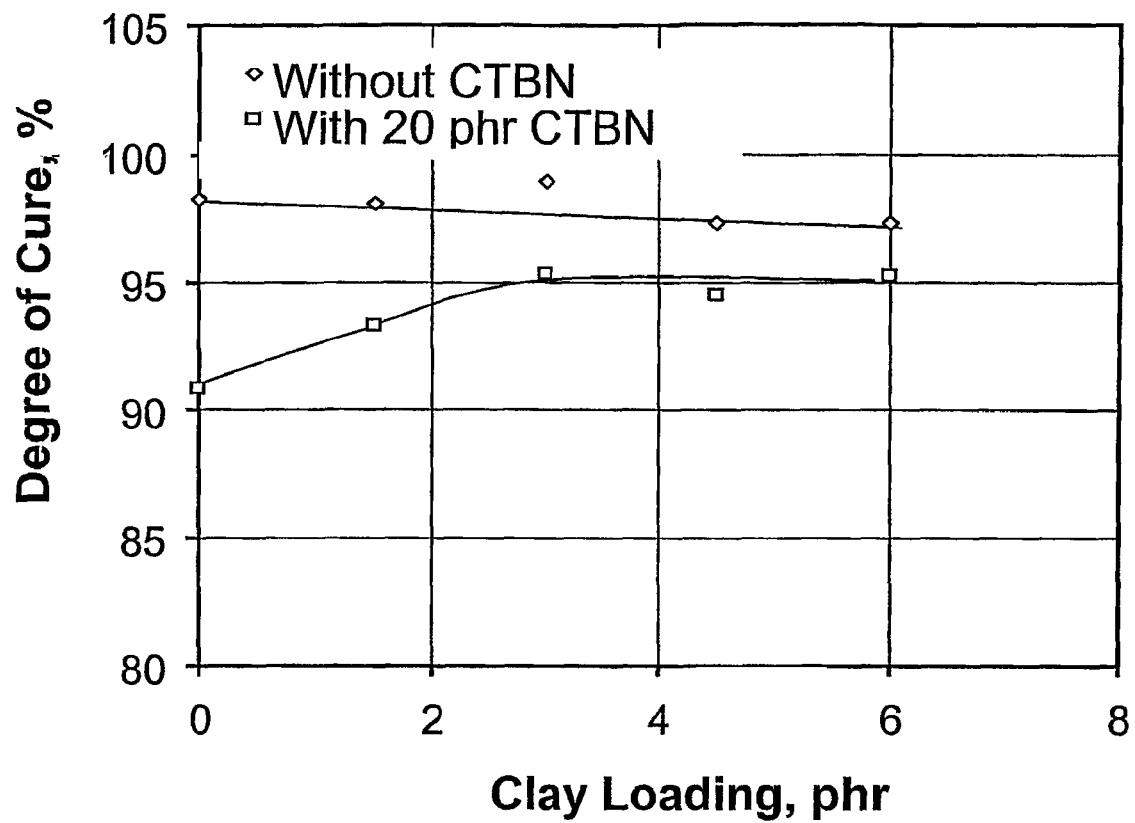
FIG. 12 shows a degree of cure of nanocomposites as a function of clay loading.

Observed changes of degree of cure for nanocomposites seem similar to those of the glass transition temperature (shown in FIG. 12). This indicates that adding organoclay into the pristine epoxy reduces the degree of cure, and thus the glass transition temperature Tg; conversely, adding organoclay into rubber-modified epoxies increases the degree of cure and the glass transition temperature Tg.

Figure 13:
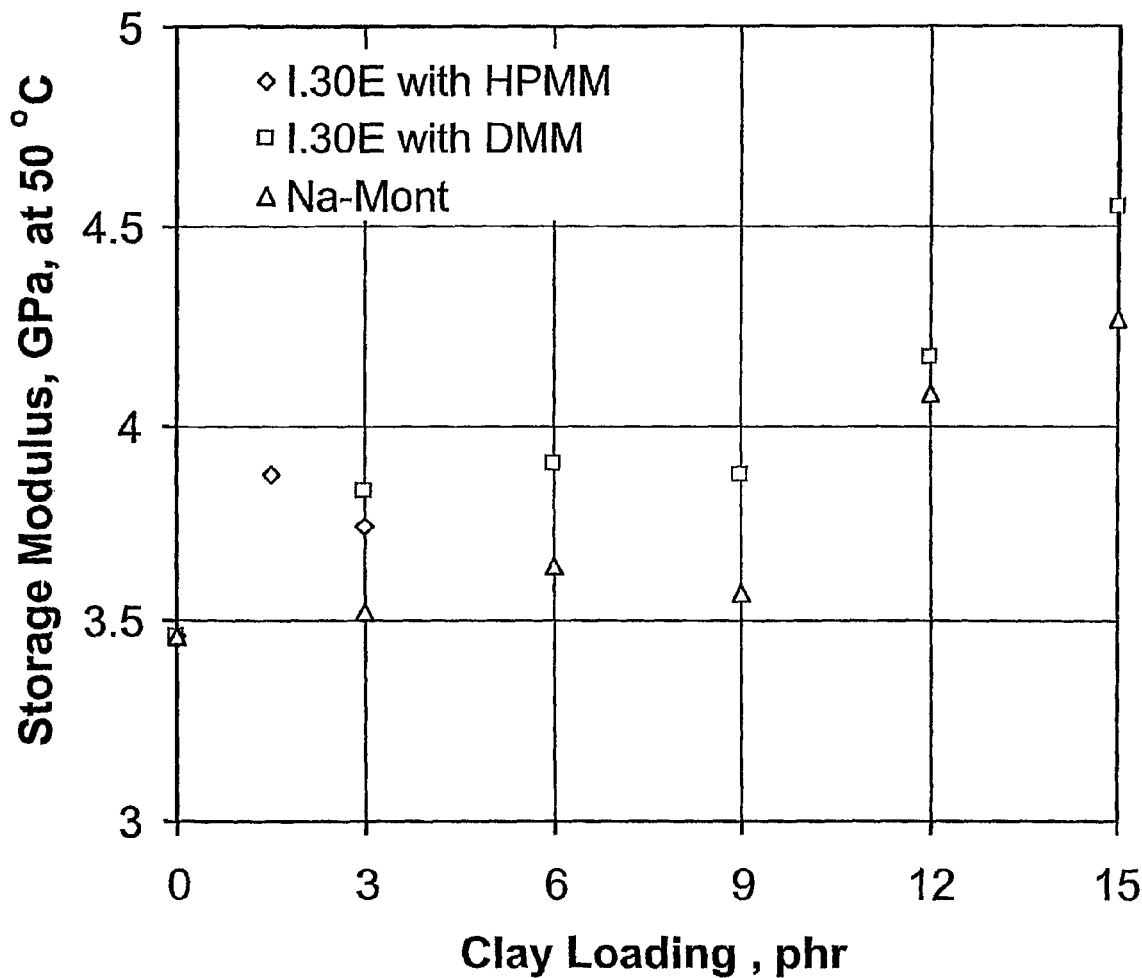
FIG. 13 is a graph of the storage modulus at 50° C. of nanocomposites and filler composites as a function of clay loading.

As may be seen in FIG. 13, the storage modulus at 50° C. of nanocomposites and filler composites increases with increased clay loading, the increase for nanocomposites (rhomboids and squares) being greater than for filler composites (triangles).

Figure 14:
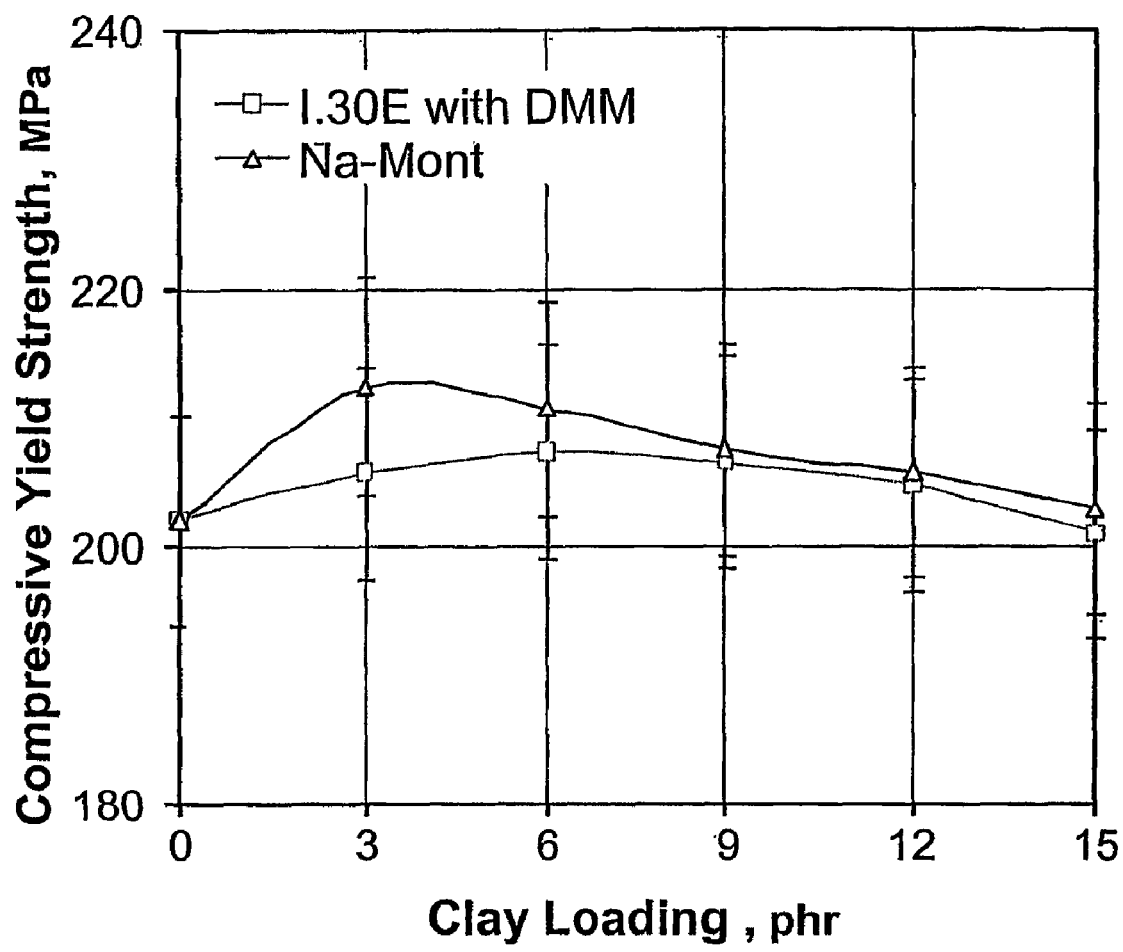
FIG. 14 is a graph of the compressive yield strength of nanocomposites and filler composites as a function of clay loading.
Figure 15:
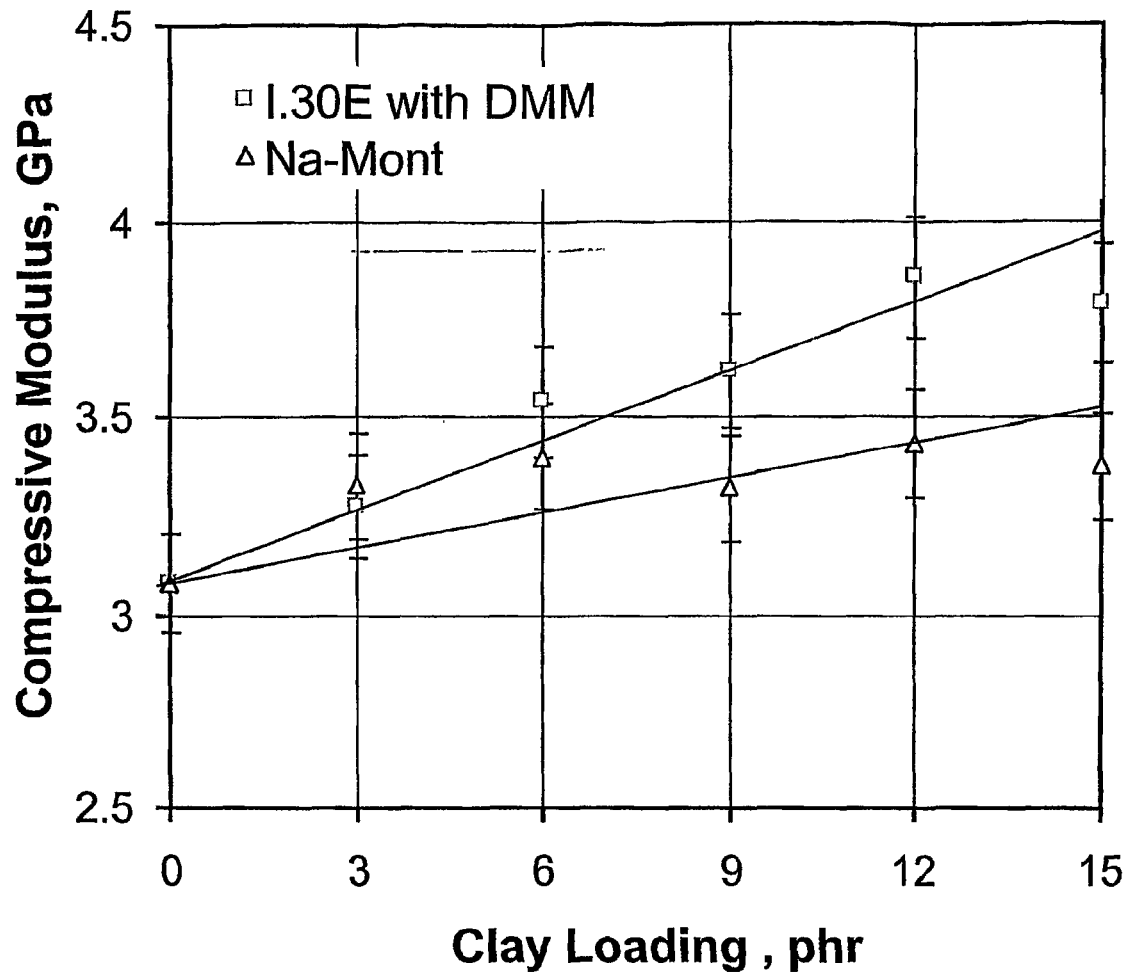
FIG. 15 is a graph of the compressive modulus of nanocomposites and filler composites as a function of clay loading.

FIGS. 14 and 15 show the compressive yield strength and compressive modulus of nanocomposites and filler composites, while FIGS. 16, 17-19 show typical compressive stress-strain curves of pristine resin and different modified epoxies (FIG. 16), the compressive yield strength (FIG. 17), the compressive modulus (FIG. 18) and the ultimate strength (FIG. 19) of rubber modified nanocomposites respectively, as a function of clay loading.

In FIG. 14, both nanocomposites (squares) and filler composites (triangles) show a compressive yield strength practically unchanged at different clay loadings. At a lower clay loading, i.e. less than 3-phr and 6-phr respectively for filler composites and nanocomposites, the compressive yield strength increases, and it decreases with increasing the clay loading above this value. Nanocomposites (squares) even have a slightly lower yield strength than filler composites (triangles). However the increase in modulus of nanocomposites (squares) is substantially higher than in filler composites (triangles) (FIG. 15). There is more than 20% increase in modulus of TGDDM-DDS at 9-phr organoclay loading but only a 10% increase for pure (untreated) clay.

Figure 16:
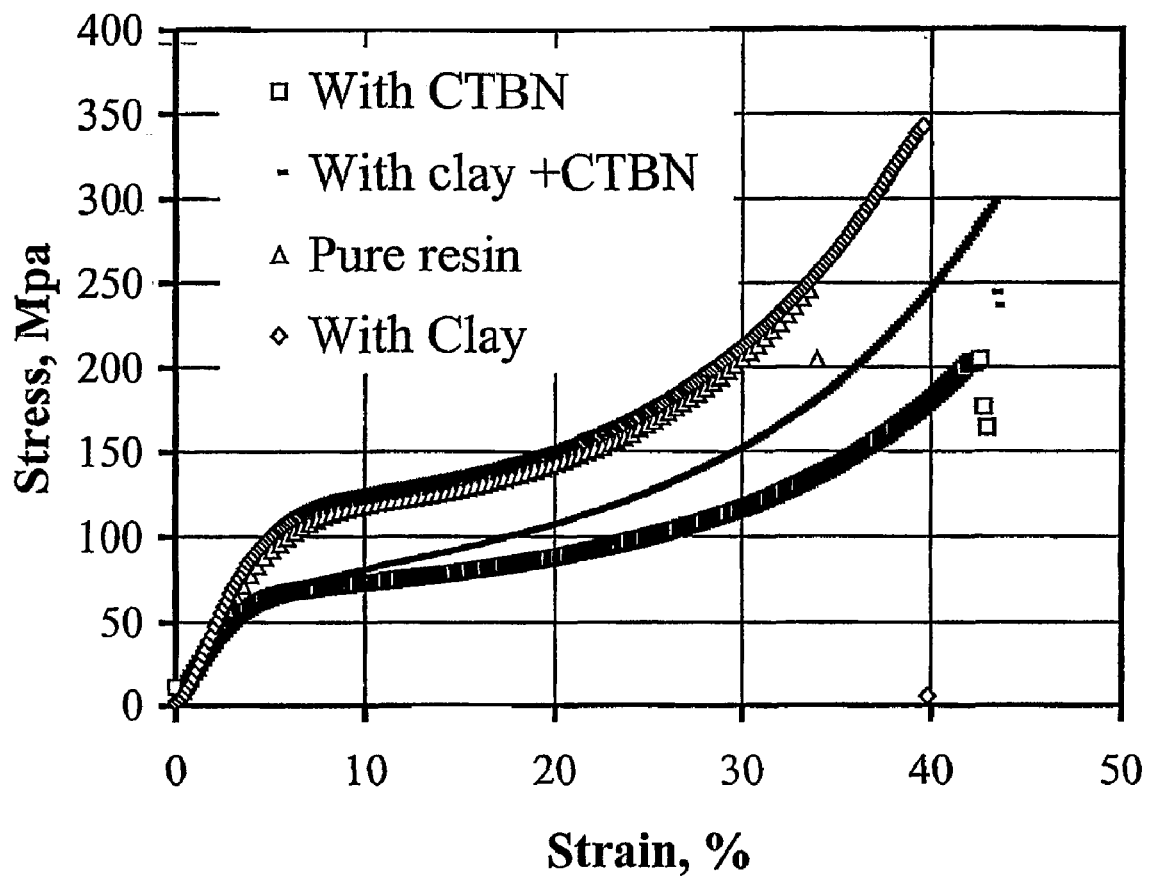
FIG. 16 shows typical compressive stress-strain curves of pristine resin and modified epoxies.

FIG. 16 shows apparent ductility with different modulus, ultimate strength, yield strength and fracture strain. The pristine resin has higher yield strength but lowest fracture strain. Nanocomposites without CTBN have the highest modulus, ultimate strength and yield strength. By adding CTBN to the epoxy resin, fracture strain increases, but yield strength, modulus and ultimate strength are reduced. Furthermore, by adding organoclay into the rubber-modified epoxy, the strength in the plastic region is increased whilst maintaining the high fracture strain.

Figure 17:
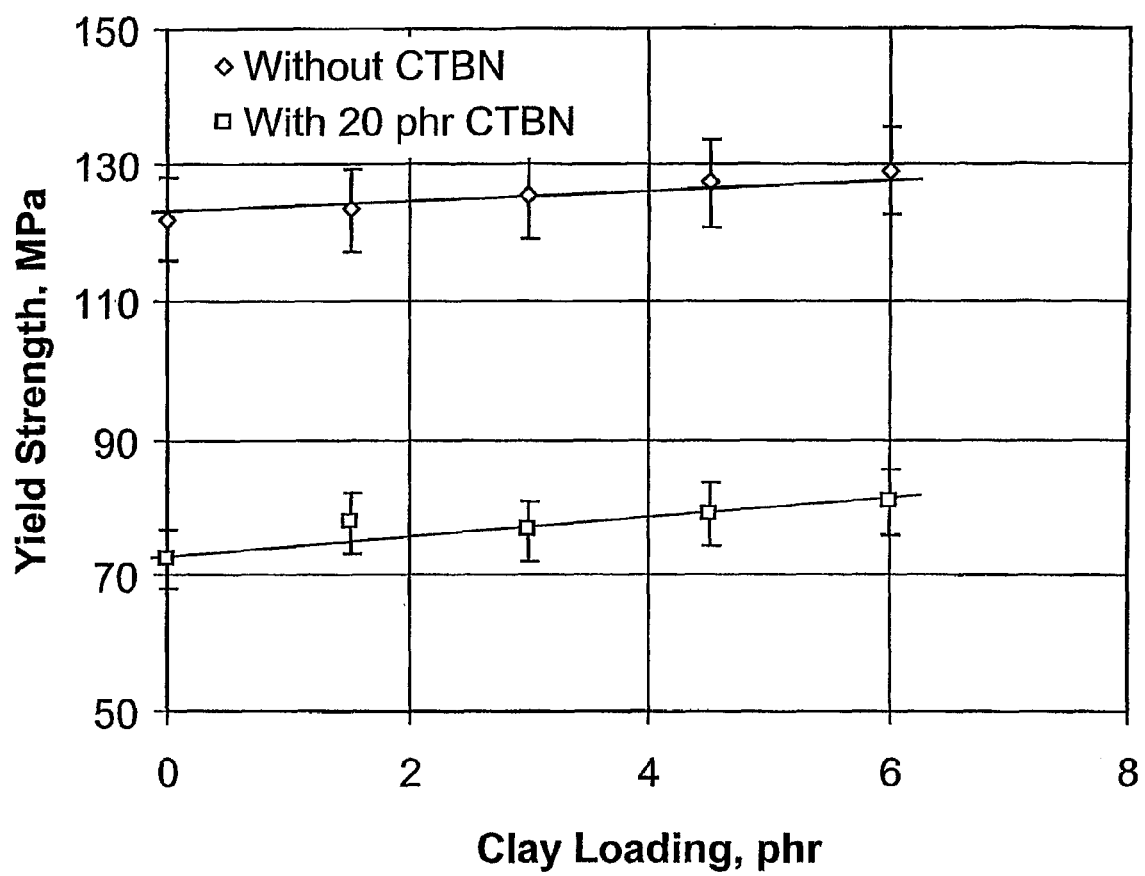
FIG. 17 is a graph of the compressive yield strength of modified nanocomposites as a function of clay loading.
Figure 18:
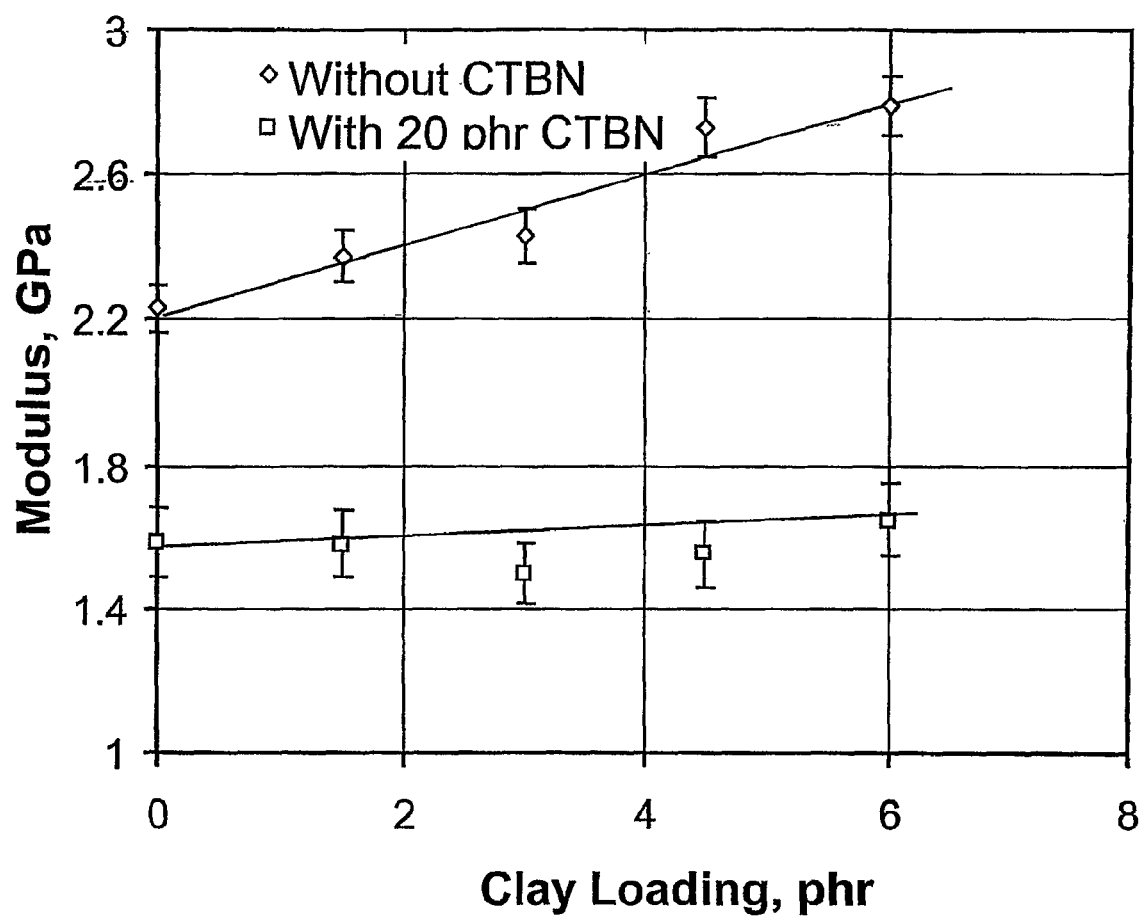
FIG. 18 is a graph of the compressive modulus of modified nanocomposites as a function of clay loading.
Figure 19:
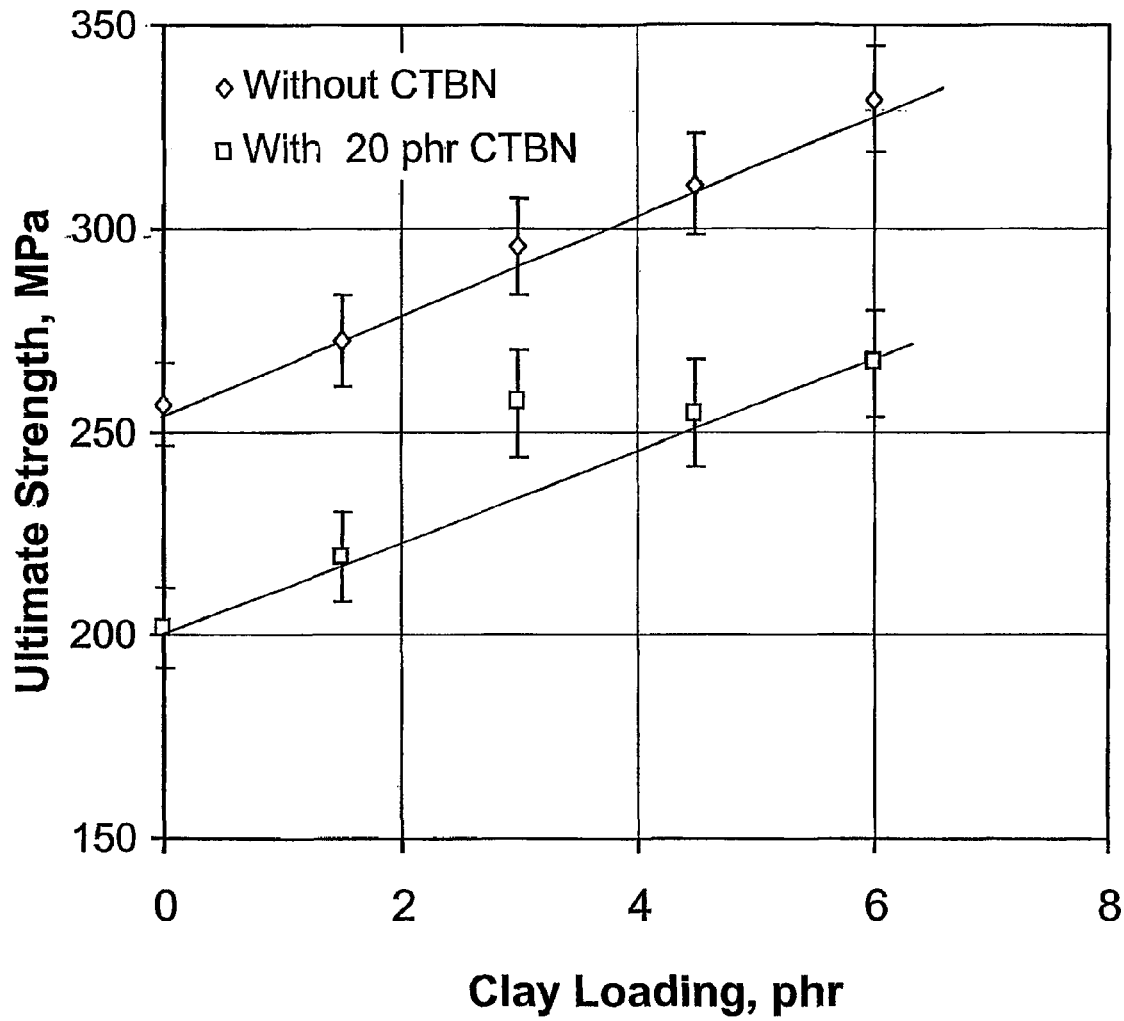
FIG. 19 is a graph of the ultimate strength of modified nanocomposites as a function of clay loading.

The yield strength, modulus, ultimate strength of modified epoxies as a function of clay loading are shown in FIG. 17-19 respectively. For nanocomposites without CTBN, it is observed that all compressive properties increase with increasing the clay loading. They show 25.1%, 29.1%, and 5.8% increases respectively, compared to pristine resin with 6-phr organoclay loading. For nanocomposites with CTBN, although the yield strength and ultimate strength also increase with increasing clay loading, the modulus and fracture strain (see FIG. 20) are almost unchanged. Hybrid nanocomposites with 20-phr CTBN and 6-phr organoclay show a 3.9%, 12.0% and 32.2% increase respectively in modulus ultimate strength and yield strength, compared with rubber-modified epoxies for a similar CTBN content.

Figure 20:
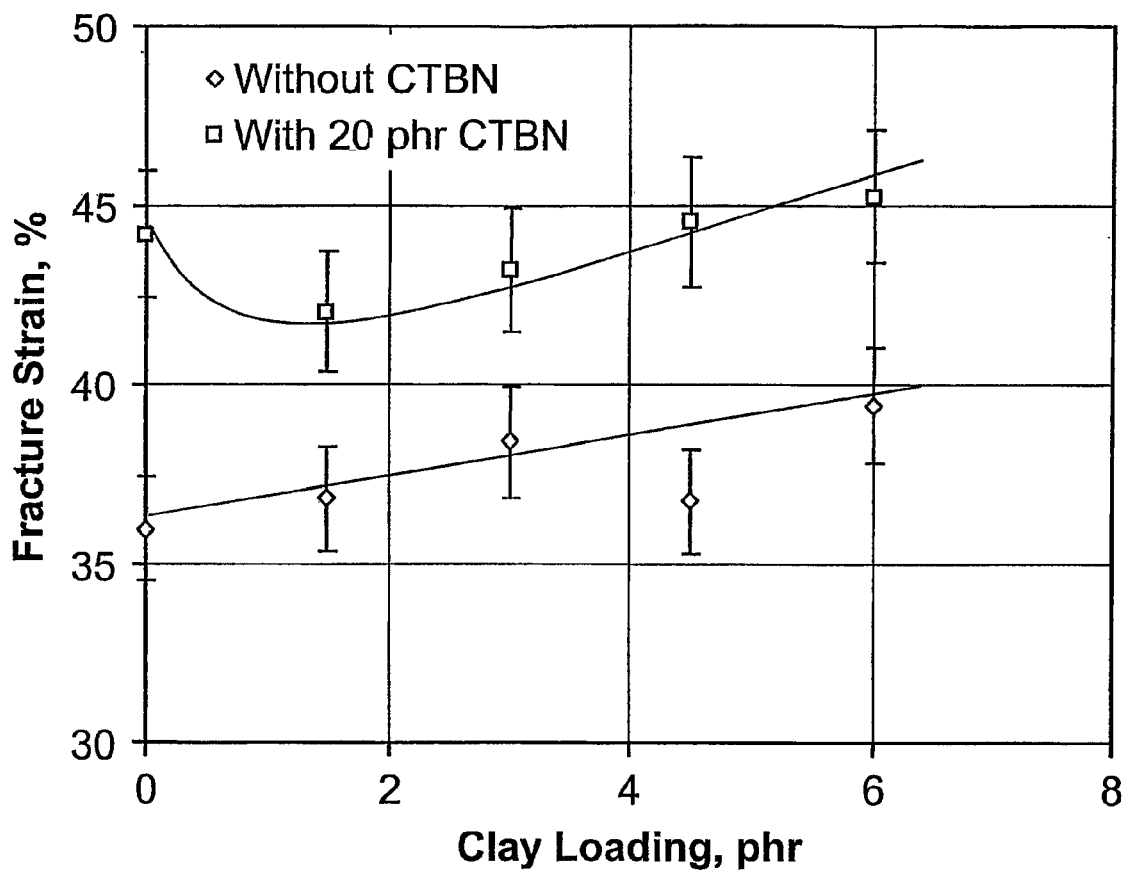
FIG. 20 is a graph of the fracture strain of modified nanocomposites as a function of clay loading.

FIG. 20 shows fracture strain of rubber-modified nanocomposites as a function of clay loading. For nanocomposites without CTBN, the fracture strain shows a 9.6% increase compared to that of pristine resin with 6-phr organoclay loading, and for nanocomposites with CTBN, as observed in relation to the modulus, the fracture strain is almost unchanged. Hybrid nanocomposites with 20-phr CTBN and 6-phr organoclay show a 2.4% increase in the fracture strain compared with that of rubber-modified epoxies at a similar CTBN content.

Figure 21:
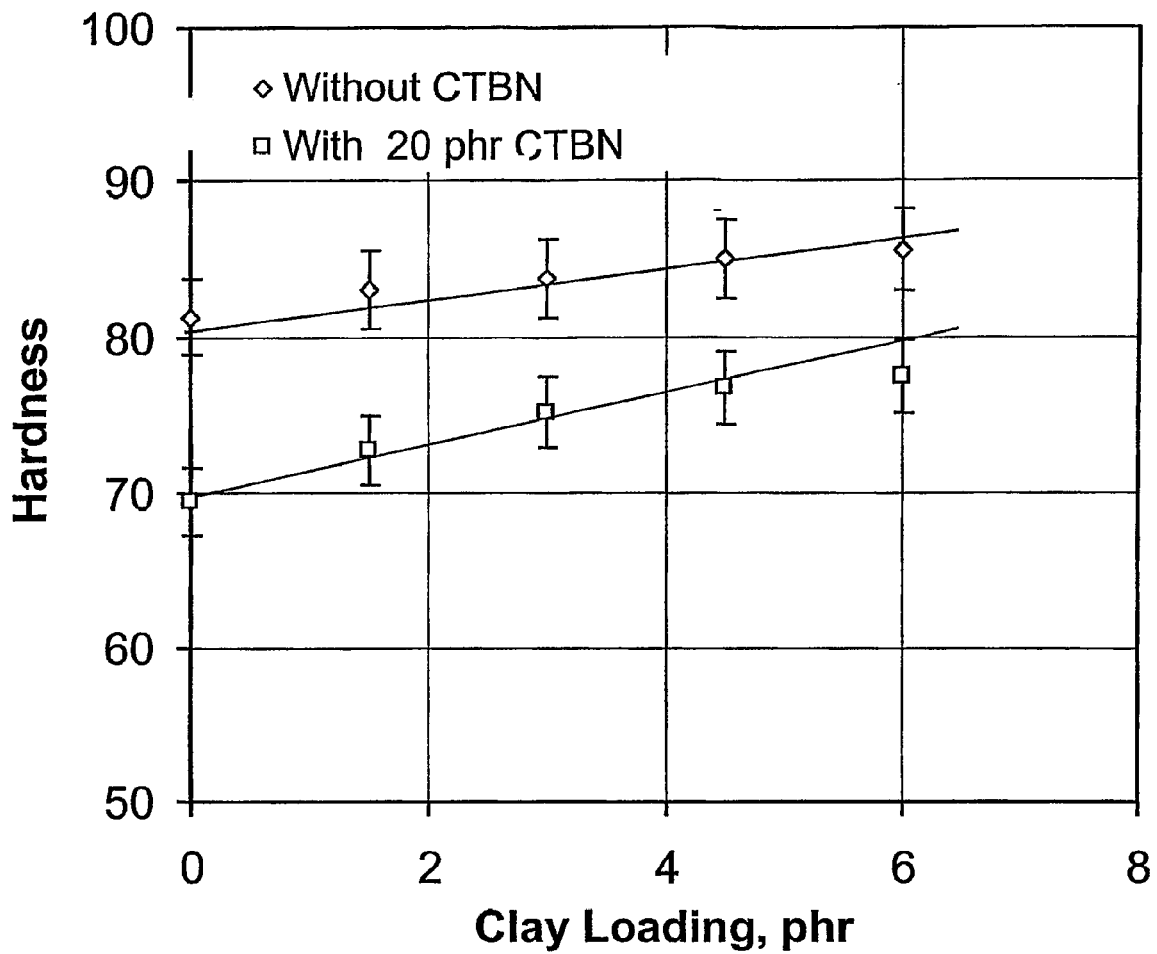
FIG. 21 is a graph of the hardness of modified nanocomposites as a function of clay loading.

Hardness of nanocomposites with and without CTBN is compared in FIG. 21. Nanocomposites without CTBN have higher hardness values but less improvement with increasing clay loading compared to nanocomposites with CTBN. When adding 20-phr CTBN into the epoxy, a reduction of about 15% in hardness is observed, and when adding 6-phr organoclay into the rubber-modified epoxy, an increase of about 11% is obtained.

As known in the art, fracture toughness is characterized through a critical stress intensity factor $K_{1C}$ (in units of $MPa.m^{1/2}$) and a critical strain energy release rate $G_{1C}$ (in units of $J/m^2$).

Figure 22:
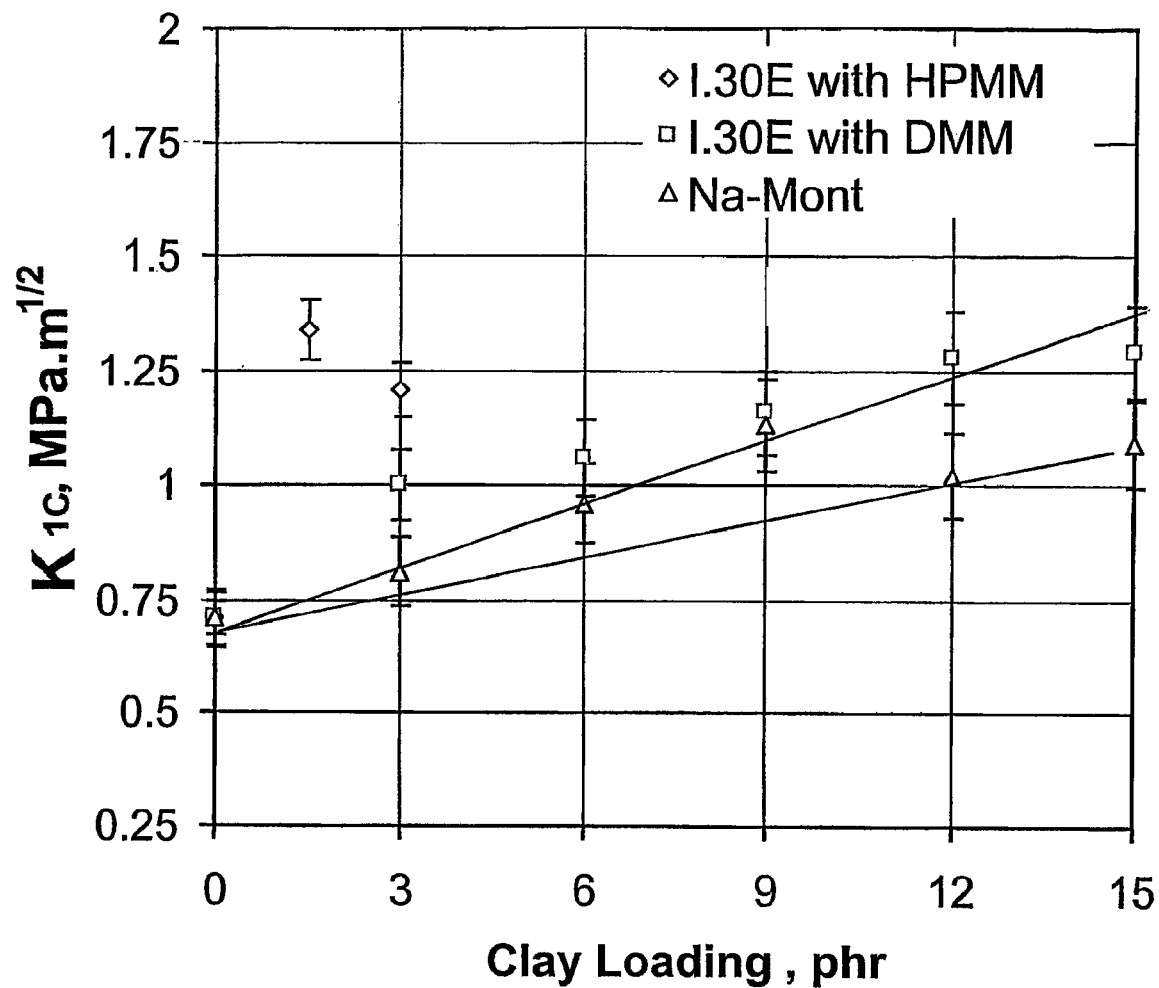
FIG. 22 is a graph of the critical stress intensity factor ($K_{1C}$) of nanocomposites and filler composites as a function of clay loading.
Figure 23:
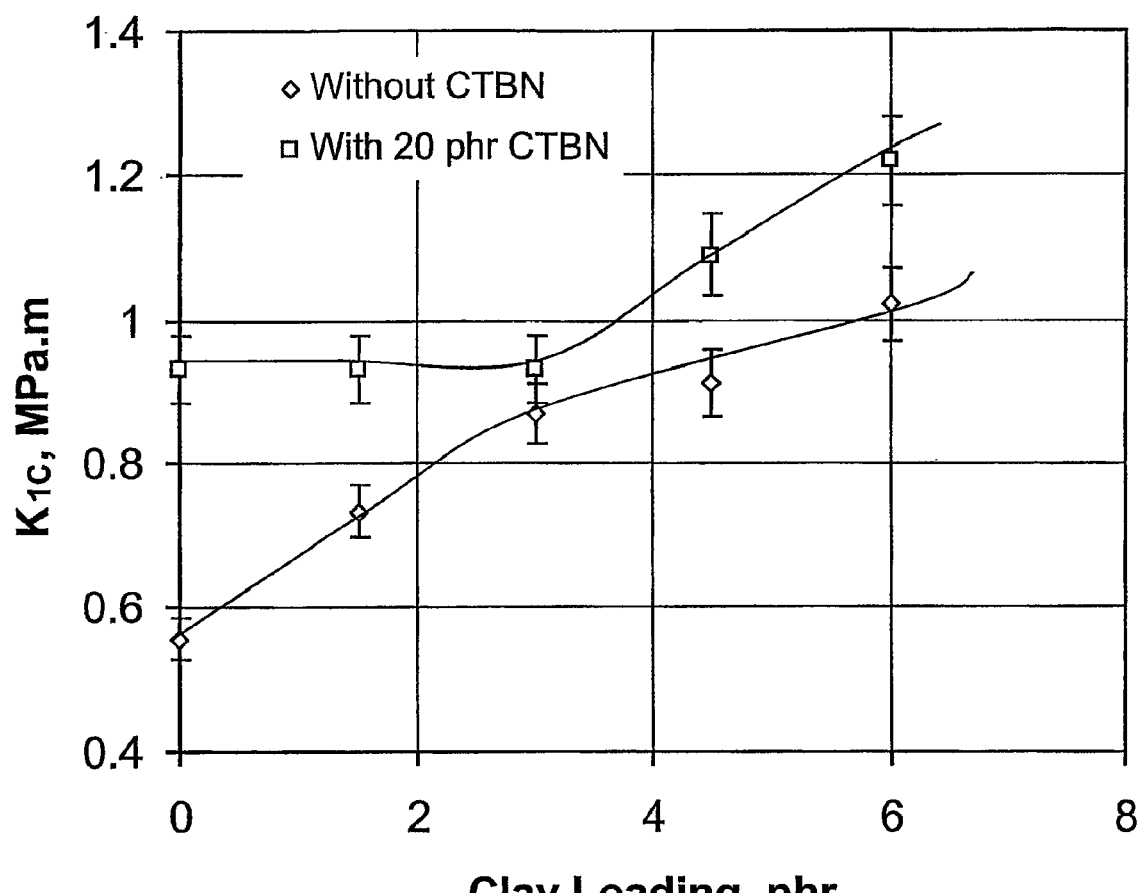
FIG. 23 is a graph of the critical stress intensity factor ($K_{1C}$) of modified nanocomposites as a function of clay loading.

FIGS. 22 and 23 show the critical stress intensity factor $K_{1C}$ of nanocomposites and filler composites, and of rubber epoxies respectively, as a function of clay loading, as measured by single-edge-notch bending (SENB).

FIGS. 24 and 25 show the critical strain energy release rate $G_{1C}$ of nanocomposites and filler composites, of rubber epoxies, and of epoxy TGDDM/DDS prepared with a Direct Mixing Method and with the method of the present invention respectively, as a function of clay loading, as measured by SENB.

Nanocomposites obtained with the direct mixing method (DMM) show an increase in $K_{1C}$ (FIG. 22) higher than filler composites, as a function of clay loading. It shows more than 79% increase in $K_{1C}$ of TGDDM-DDS at a 12-phr organoclay loading but only a 36% increase in the case of untreated clay.

Nanocomposites obtained by the method of the present invention show a dramatic increase in fracture toughness at very low clay loading, with an increase in $K_{1C}$ and $G_{1C}$ of 2 and 3 times respectively at only 1.5-phr (about 1 wt %) organoclay loading.

CTBN-modified nanocomposites, as compared to nanocomposites without rubber, show a further increase in both $K_{1C}$ (FIG. 23) and $G_{1C}$ (FIG. 24) (over rubber-modified epoxies) as the clay loading increases. All nanocomposites contain the same content of CTBN (20-phr) and different organoclay contents ranging from 0 to 6-phr. At clay loading of less than 3-phr, fracture toughness increases slowly, but, above this value, it dramatically improves. $K_{1C}$ and $G_{1C}$ are increased by 2.2 and 7.6 times respectively at 6-phr organoclay loading and 20-phr CTBN, compared with the pristine epoxy system. Therefore, there is a superposition effect on fracture toughness of hybrid epoxy nanocomposites modified with rubber and organoclay.

FIG. 25 is a graph of the critical strain energy release rate $(G_{1C})$ of epoxy TGDDM/DDS obtained with a Direct Mixing Method (rhomboids) and with the method of the present invention (squares). It shows that the fracture toughness of the epoxy obtained by the present method is increases by 5.8 times the fracture toughness of the pristine epoxy.

Scanning electron microscopy (SEM) is used to observe toughening in filler composites and nanocomposites. Pristine resin samples show smooth and featureless surfaces representing brittle failure in a homogenous material and even at high magnification. In a typical fracture topology of filler composites (6-phr clay loading), agglomerates are observed in different sizes and a maximum diameter thereof is about 20 µm (see FIGS. 26). The particles are debonded from the resin and voids are formed around the particles due to the poor compatibility and the low adhesive strength of interface between epoxy and untreated clay. Thus the toughness improvement may be attributed to crack tip blunting from these features. A small number of shallow 'river-markings' around the particles running in the direction of crack propagation is observed. These river-markings occur as a result of crack deflection and subsequent propagation on two slightly different fracture planes.

Nanocomposites obtained with the direct mixing method (DMM) exhibit very different fracture surfaces (FIGS. 27). Agglomerates of a maximum diameter of about 30 µm, which is larger than that in the filler composites, are observed. Only a few parts of the interfaces are debonded form the resin and fewer voids are formed. This may be attributed to the fact that epoxy molecules intercalate the organoclay, thereby resulting in a formation of rigid, impenetrable and well-bonded agglomerates, which impede propagation of cracks. As a propagating crack thus becomes pinned and starts to bow out between the particles, forming secondary cracks, deeper river-markings around agglomerates are formed. It seems that, in contrast to filler composites, the pinning effect may be dominant over the crack tip blunting effect in enhancing the fracture toughness of nanocomposites obtained with the direct mixing method (DMM).

Figure 28A:
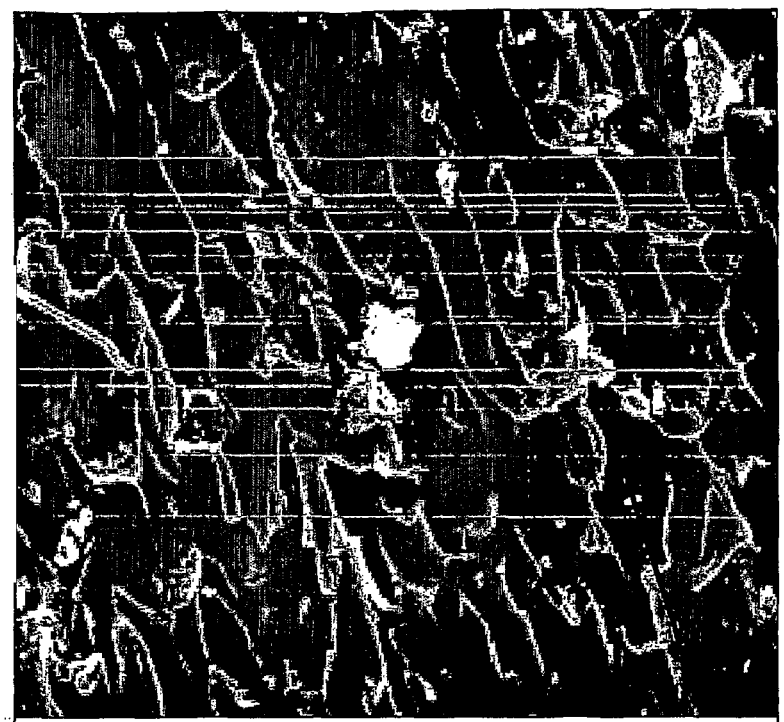
FIG. 28 shows SEM micrographs of fracture surface of nanocomposites obtained with the method of the present invention at 1.5-phr organoclay; a FIG. 29 shows SEM micrographs of a) a pristine resin sample; b) modified epoxy at 20-phr CTBN rubber content; c) of nanocomposites at 6-phr clay loading; d) of nanocomposites at 6-phr clay loading (×2000); e) epoxy modified with both rubber and organoclay at low clay loading; f) of epoxy modified with both rubber and organoclay at low clay loading at a high magnification image; g) of epoxy modified with both rubber and organoclay at a clay loading of 6-phr; and h) of epoxy modified with both rubber and organoclay at a clay loading of 6-phr at a high magnification image.
Figure 28B:

In a fracture surface of nanocomposites obtained with the present method (FIGS. 28), no distinct agglomerates are seen, even at relatively high magnification. Crack bifurcation are observed at higher magnification and may be associated with the presence of very small particles of the dispersed clay, assumed to cause the pinning effect. Clearly, incorporation and progressively better dispersion of the clay in the resin enhance the efficiency of this pinning effect and thus result in a considerable change in fracture behavior.

The fracture surface of modified epoxies at 20-phr CTBN rubber content may also be observed using SEM (FIGS. 29). A two-phase microstructure with rubber spheres dispersed in the continuous epoxy phase is seen. Tearing of the material between two crack planes (see white lines on FIG. 29b) may cause a surface step. Some cavities are observed in the rubber particles and the epoxy resin because of the cohesive failure of rubber particles. In FIG. 29c, the fracture surface of nanocomposites at 6-phr-clay loading exhibits very different failure mode, as in the case of filler-modified epoxies. However, no distinct agglomerates are observed even at relatively high magnification (×2000). The crack bifurcation is quite evident at such higher magnification in FIG. 29d and may be associated with the presence of very small particles of the dispersed clay. Therefore, it appears that toughening mechanisms are different in rubber and in organoclay.

Figure 29E:
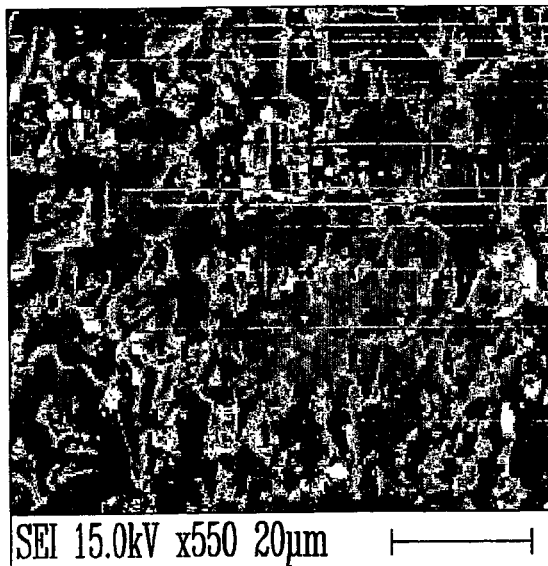
Figure 29F:
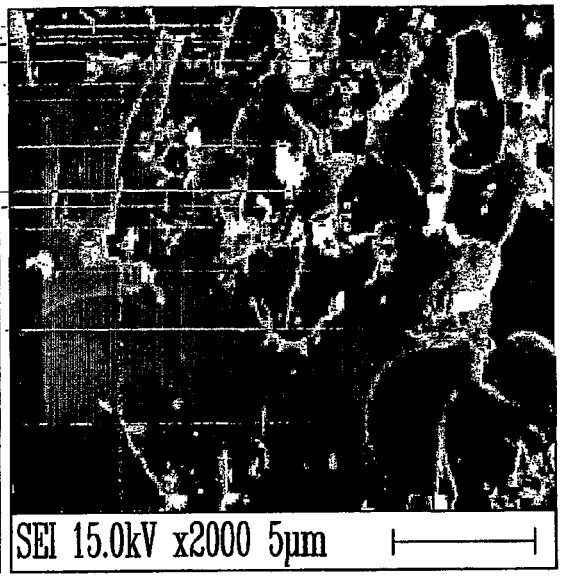
Figure 29G:
Figure 29H:
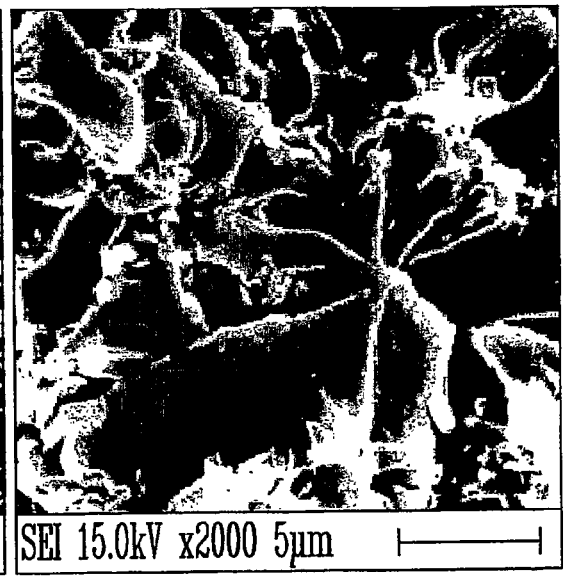

In the case of epoxies modified with both rubber and organoclay at low clay loading, the fracture surfaces show both features of fracture surfaces described above (FIG. 29e). In a high magnification image (FIG. 29f), the crack bifurcations are smaller, which may indicate that toughness of this material is mainly due to toughening by rubber at lower clay loading. On increasing the clay loading to 6-phr, the fracture surfaces exhibit a strong three-dimensional appearance (FIG. 29g and 29h). No rubber particles are seen, but the crack bifurcation is very strong, resulting in multiple fracture surfaces and causing greater energy dissipation.

In summary, it is shown that the direct mixing method (DMM) yields nanocomposites in which organoclay is exfoliated and/or intercalated as observed from XRD data, but does not achieve a uniform distribution thereof in the epoxy resin since organoclay is mostly aggregated on a micro scale. Therefore, nanocomposites obtained with the direct mixing method (DMM) show a higher toughness and modulus than filler composites, and a glass transition temperature (Tg) that decreases slightly as the content of clay increases.

In contrast, the method of the present invention enhances the degree of exfoliation of organoclay and breaks up agglomerates thereof. As a result, nanocomposites obtained with the method of the present invention show a dramatic improvement in fracture toughness at very low clay loading; that is, $K_{1C}$ and $G_{1C}$ are increased by 2 and 3 times respectively at 1.5-phr (about 1 wt %) organoclay loading over the pristine resin properties.

In the case of rubber-modified epoxies, the present method further yields enhancement in the glass transition temperature Tg and mechanical performances. Modification with organoclay simultaneously improves the fracture toughness and compressive properties of DGEBA/BF$_3$.MEA, that is, $K_{1C}$ and $G_{1C}$, increased by 1.84 and 2.97 times, respectively; compressive modulus, ultimate strength, yield strength and fracture strain increased by 25.1%, 29.1%, 5.8% and 9.6% respectively, at 6-phr concentration of CTBN, modification of the epoxy with organoclay and rubber not only further improves fracture toughness, that is, $K_{1C}$ and $G_{1C}$ are increased by 2.2 and 7.6 times respectively, at 6-phr organoclay loading and 20-phr CTBN compared to the pristine resin, but also enhances the glass transition temperature Tg, yield strength and ultimate strength compared with rubber-modified epoxies with a similar content of CTBN. Modification with organoclay improves the fracture toughness of TGDDM/DDS epoxy resin in which the strain energy release rate ($G_{1C}$) of the virgin epoxy increases by 5.8 times with a clay loading of 5 phr.

Other properties have been measured, including water absorption resistance (FIG. 30), adhesion strength (FIG. 31), flammability resistance (FIG. 32), and stability of the solution of clay particles (Table I).

Figure 30:
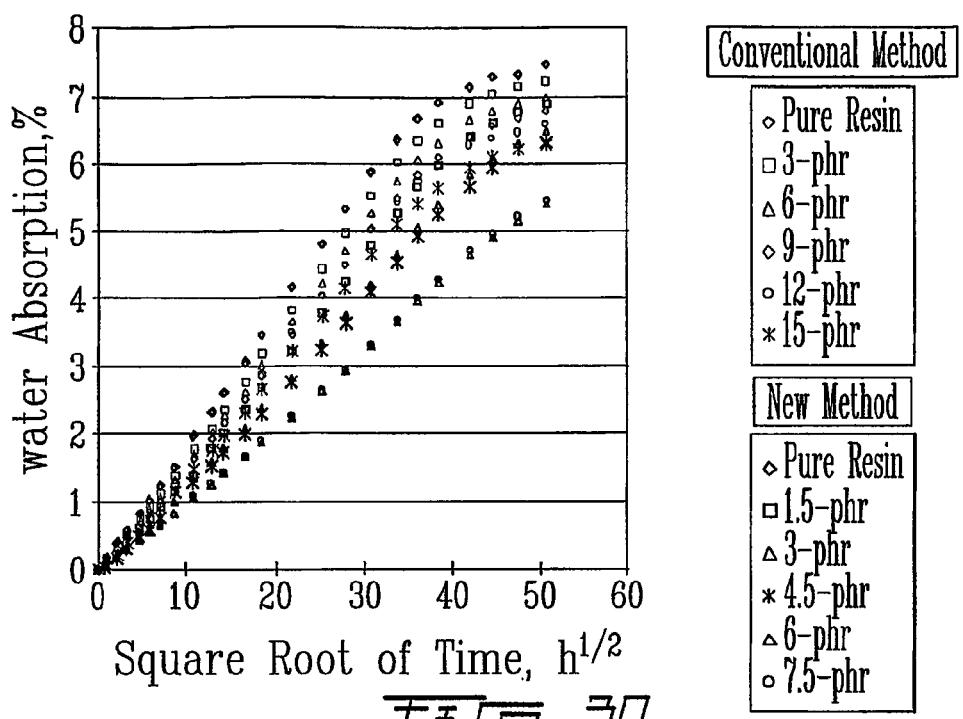
FIG. 30 plots the water absorption as a function of time, in pure epoxy (TGDDM/DDS), epoxy obtained using the direct mixing method, and epoxy obtained using the method of the present invention.

As may be seen from FIG. 30, the absorption of water is decreased in epoxies obtained by the present method compared with that of epoxies obtained with the direct mixing method.

Figure 31:
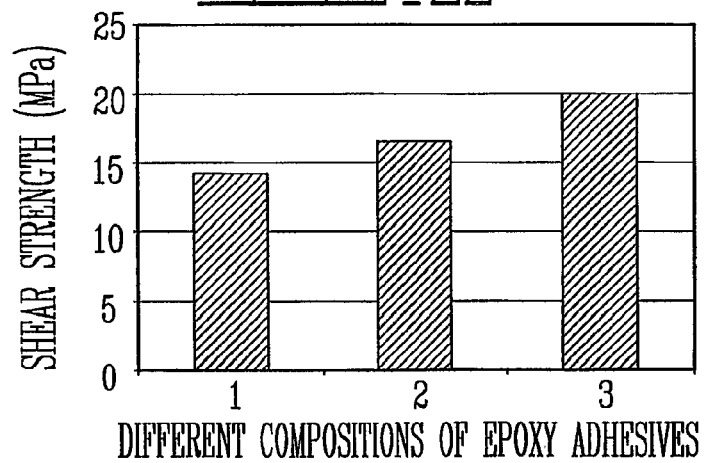
FIG. 31 shows the shear strength of different compositions of epoxy adhesives on aluminum substrates 1) Pure epoxy (Shell Epon 828/EPI3046), (2) Epoxy with organoclay using Direct Mixing Method, (3) Epoxy with the present method.

FIG. 31 shows the increase in adhesion strength of different compositions of epoxy adhesives on aluminum substrates. Pure epoxy resins, resins mixed with organoclay using the Direct Mixing Method and Resins mixed with organoclay using the present method are used as adhesives for bonding aluminum substrates, and shear strength is determined by lap shear tests.

Figure 32:
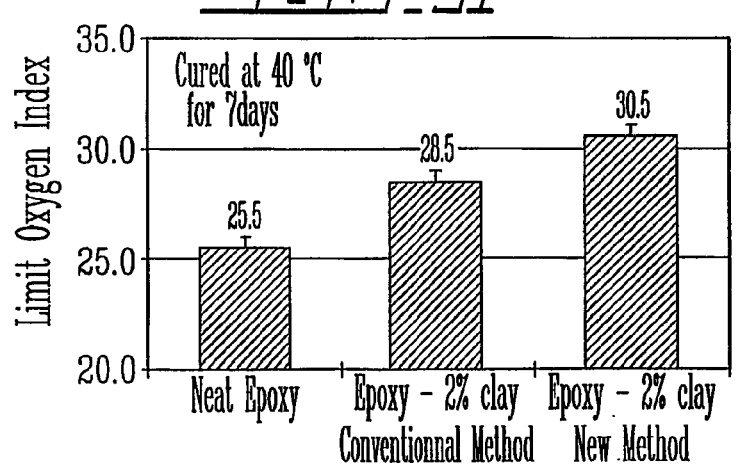
FIG. 32 shows the Limiting Oxygen Index for pure epoxy and epoxy mixed with nanoclay using different methods.

FIG. 32 illustrates an enhancement inflammability resistance, as determined by the Limiting Oxygen Index of pure epoxy and nanoclay epoxy obtained with different methods. Samples of Shell Epon 828 epoxy cured with EPI3046 are subjected to flammability test using the Limiting Oxygen Index instrumentation. The results show that pure epoxy has an oxygen index of 25.5; epoxy nanocomposite obtained by the Direct Mixing Method has an Oxygen Index of 28.5, and epoxy nanocomposite prepared by the present method has an Oxygen Index of 30.5.

Turning now to Table I below, the stability of the particles in suspension in clay particle solutions is investigated by following the settlement of the particles in a graduated cylinder over time. Clay-acetone suspensions produced by the Direct Mixing Method and by using different pressures in the present method are compared. 10 ml of liquid suspensions were contained in different cylinders, a white part on a lower part of the cylinders corresponding to the clay-acetone solution, and a black part on the upper part corresponding to clay separated and condensed down to the lower part. Table I below indicates the height (in ml) of the lower white part in each cylinder. For the two clay concentrations used (5% and 10%), after 3 months in suspension, solutions mixed using the Direct Mixing Method show only about 16% to 21% of the column in white, whereas solutions mixed using the present method mixed at 25,000 psi shows that 99% of the column is still white.

TABLE I

| Clay concentration | Mechanical Stirring | HPM, pressure range (psi) | | | | |
|---|---|---|---|---|---|---|
| | | 5k | 10k | 15k | 20k | 25k |
| 5% | 1.6 | 5.5 | 7.3 | 8.8 | 9.8 | 9.9 |
| 10% | 2.1 | 8.5 | 9.8 | 9.9 | 9.9 | 9.9 |

From the foregoing, it should now be apparent that the present invention provides a method comprising preparing a solution of clay particles solution, submitting the solution of clay particles first to a high pressure and high velocity flow for shearing the particles in the solution, and to a sudden lower pressure, whereby the particles explode into the mist of the solution, and mixing the finely dispersed solution, whereby epoxy is introduced in the solution during one of the above steps of preparing the solution of clay particles or dispersing the solution or to the resulting dispersed solution, yielding an extremely fine and homogeneous distribution of the particles of nano-dimensions in the epoxy, yielding a high-performance nanocomposite epoxy.

Clearly, the method and system of the present invention allow that clay agglomerates be broken down with an increased degree of exfoliation of the clay and increased dispersion.

The glass transition temperature Tg of the resulting epoxy is increased and increasingly stable, while the compressive properties are also increased, at constant clay loading. The obtained epoxies have a fracture toughness many times higher and enhanced barrier properties against small molecules than that of current epoxies, while produced at a competitive cost.

In particular, it is shown that the present method yields identical storage modulus, which indicates enhanced viscoelastic properties, and identical $K_{1C}$ factor, which indicates improved fracture toughness, as the direct mixing method for half and one tenth the load of clay respectively, while a factor $G_{1C}$, which indicates the critical strain energy release rate, is increased by more than 33% for one tenth the load of clay.

Epoxy nanocomposites obtained by the present method therefore have a load in clay reduced to between 1% and 3%, which translates into a significant reduction of expensive clay content for enhanced properties. As people in the art will appreciate, this increased fracture toughness improves greatly the capability of the material to absorb energy, for example from impact, and to resist growth of cracks.

It is further shown that the present invention provides epoxies with enhanced barrier properties, including water absorption resistance, adhesion strength and flammability resistance.

Moreover, it is noted that the mixtures of epoxy and clay and epoxy, clay and additives as obtained herein show an enhanced stability, over a period of time up to 6 months for example following dispersion of clay by the present method.

The present method and system may therefore allow preparation of pre-mixed solutions, ready for an end user to add thereto additives and agents such as curing and accelerator agents for example, before forming and curing.

It has been shown that the present invention improves significantly the overall properties of the epoxy/clay nanocomposite systems. The method of the present invention may further be applied for increasing the properties of other thermoset systems, like polyurethane, and thermoplastic systems, like PET (polyester). Furthermore, the present method may be used to disperse different families of additives, including, for example, magnetic nanoparticles, metallic and non-metallic nanoparticles, carbon-based nanoparticles, and oxide nanoparticles.

Although the present invention has been described hereinabove by way of embodiments thereof, it can be modified, without departing from the spirit and nature of the subject invention as described herein.

What is claimed is:

1. A method for making a modified epoxy, comprising the steps of:
   a) preparing a clay solution comprising solvents, clay particles of a dimension in the nanometer range and agglomerates of clay particles;
   b) generating a flow of clay solution and submitting said flow to: (1) high pressure to generate high velocity and to allow shearing in the clay solution to occur; (2) a region of obstacles allowing the agglomerates of clay particles to be broken down; and (3) a sudden lower pressure, yielding a dispersed clay solution having a fine and homogeneous distribution of clay particles of a dimension in the nanometer range in the clay solution; and
   c) mixing the dispersed clay solution with at least a pristine epoxy, wherein a rubber material is optionally provided with the pristine epoxy during mixing.

2. The method according to claim 1, wherein said step a) comprises incorporating a first part of the pristine epoxy into the clay solution; and said step c) comprises mixing the dispersed clay solution with a remaining part of the pristine epoxy.

3. The method according to claim 1, wherein said step a) comprises mixing with at least one of mechanical and ultrasonic mixing.

4. The method according to claim 1, wherein said step b) comprises submitting the clay solution to a pressure of about 20,000 psi in tubes of a diameter of about 0.1 mm.

5. The method according to claim 1, wherein said step b) comprises exfoliating the clay particles in the solution.

6. The method according to claim 1, wherein said step c) comprises adding curing agents to yield a solid epoxy material.

7. The method according to claim 1, whereby the modified epoxy comprises agglomerates of less than about 1 μm and agglomerates of a maximum diameter between about 1 μm and 2 μm.

8. The method according to claim 1, whereby the modified epoxy has enhanced viscoelastic properties and improved fracture toughness compared to the pristine epoxy.

9. The method according to claim 8, wherein a content of about 1 wt% of clay loading and no optional rubber yields an increase in critical stress intensity ($K_{1C}$) and critical strain energy release rate ($G_{1C}$) of 2 and 3 times respectively, with respect to the pristine epoxy.

10. The method according to claim 1, whereby the modified epoxy has enhanced barrier properties, including water absorption resistance, adhesion strength and flammability resistance, with respect to the pristine epoxy.

11. The method according to claim 1, wherein a mixture of clay and epoxy obtained has a stability over an extended period of time.

12. The method according to claim 1, wherein the optional rubber is provided with the pristine epoxy during mixing.

13. The method according to claim 12, wherein the optional rubber is CTBN, and a content of 6 phr of clay loading and 20 phr of CTBN yields an increase in critical stress intensity factor ($K_{1C}$) and critical strain energy release rate ($G_{1C}$) of 2.2 and 7.6 times respectively, with respect to the pristine epoxy.

14. A modified epoxy produced from a pristine epoxy, the modified epoxy having at least higher barrier properties and thermal resistance, a higher critical stress intensity factor ($K_{1C}$), and a higher critical strain energy release rate ($G_{1C}$) than the pristine epoxy, the modified epoxy produced by:
   a) preparing a clay solution comprising solvents, clay particles of a dimension in the nanometer range and agglomerates of clay particles;
   b) generating a flow of clay solution and submitting said flow to: (1) high pressure; (2) high velocity and breaking impacts in a region of obstacles to allow the agglomerates to be broken down; and (3) a sudden lower pressure, yielding a dispersed clay solution having a fine and homogeneous distribution of clay particles of a dimension in the nanometer range in the clay solution; and
   c) mixing the dispersed clay solution with at least part of the pristine epoxy, wherein a rubber material is optionally provided with the pristine epoxy during mixing;
   wherein a content of about 1 wt% of clay loading and no optional rubber yields an increase in $K_{1C}$ and $G_{1C}$ of 2 and 3 times respectively, with respect to the pristine epoxy.

15. The modified epoxy according to claim 14, comprising finely dispersed clay agglomerates of less than about 1 μm and agglomerates of a maximum diameter between about 1 μm and 2 μm.

16. The modified epoxy according to claim 15, wherein the optional rubber is provided with the pristine epoxy during mixing.

17. The modified epoxy according to claim 16, wherein the optional rubber is CTBN, and a content of 6 phr of clay loading and 20 phr of CTBN yields an increase in $K_{1C}$ and $G_{1C}$ of 2.2 and 7.6 times respectively, with respect to the pristine epoxy.

18. The modified epoxy according to claim 15, further comprising additives.

19. The modified epoxy of claim 14, wherein said step c) comprises adding curing agents to yield a solid epoxy material.

20. A modified epoxy produced from a pristine epoxy, the modified epoxy having at least a higher flammability resistance and a higher fracture toughness than the pristine epoxy, the modified epoxy produced by:
   a) preparing a clay solution comprising solvents, clay particles of a dimension in the nanometer range and agglomerates of clay particles;
   b) generating a flow of clay solution and submitting said flow to: (1) high pressure; (2) high velocity and breaking impacts in a region of obstacles to allow the agglomerates to be broken down; and (3) a sudden lower pressure, yielding a dispersed clay solution having a fine and homogeneous distribution of clay particles of a dimension in the nanometer range in the clay solution; and
   c) mixing the dispersed clay solution with at least part of the pristine epoxy;

wherein a content of 6 phr of clay loading yields an increase in critical strain energy release rate ($G_{1C}$) of 5.8 times, with respect to the pristine epoxy.

21. The modified epoxy of claim 20, wherein said step c) comprises adding curing agents to yield a solid epoxy material.

22. A modified epoxy produced from a rubber-modified pristine epoxy, the modified epoxy having at least a higher flammability resistance and a higher fracture toughness than the rubber-modified pristine epoxy, the modified epoxy produced by:
   a) preparing a clay solution comprising solvents, clay particles of a dimension in the nanometer range and agglomerates of clay particles;
   b) generating a flow of clay solution and submitting said flow to: (1) high pressure; (2) high velocity and breaking impacts in a region of obstacles to allow the agglomerates to be broken down; and (3) a sudden lower pressure, yielding a dispersed clay solution having a fine and homogeneous distribution of clay particles of a dimension in the nanometer range in the clay solution; and
   c) mixing the dispersed clay solution with at least part of the rubber-modified pristine epoxy;
   wherein the rubber of the rubber-modified pristine epoxy is CTBN, and a content of 6 phr of clay loading and 20 phr of CTBN yields an increase in critical strain energy release rate ($G_{1C}$) of 7.6 times, with respect to the pristine epoxy.

23. The modified epoxy of claim 22, wherein said step c) comprises adding curing agents to yield a solid epoxy material.

* * * * *